(12) United States Patent
Kimura

(10) Patent No.: US 7,164,645 B2
(45) Date of Patent: Jan. 16, 2007

(54) OPTICAL SYSTEM FOR OPTICAL PICKUP APPARATUS

(75) Inventor: Tohru Kimura, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 637 days.

(21) Appl. No.: 10/692,353

(22) Filed: Oct. 23, 2003

(65) Prior Publication Data

US 2004/0085884 A1    May 6, 2004

(30) Foreign Application Priority Data

Oct. 31, 2002    (JP) ............................. 2002-317083

(51) Int. Cl.
*G11B 7/135*    (2006.01)
*G11B 7/00*    (2006.01)

(52) U.S. Cl. ..................... 369/124; 369/126; 359/719

(58) Field of Classification Search ........... 369/112.24, 369/112.23; 359/362, 642, 708–719, 656–661
See application file for complete search history.

(56) References Cited

U.S. PATENT DOCUMENTS

| | | | |
|---|---|---|---|
| 4,770,517 A * | 9/1988 | Sakuma ..................... 359/793 |
| 6,791,934 B1 * | 9/2004 | Shimano et al. ........ 369/112.23 |
| 6,876,501 B1 * | 4/2005 | Kimura et al. .............. 359/719 |
| 7,046,450 B1 * | 5/2006 | Hirata ......................... 359/657 |

* cited by examiner

*Primary Examiner*—Wayne Young
*Assistant Examiner*—Minerva Rivero
(74) *Attorney, Agent, or Firm*—Cohen Pontani Lieberman & Pavane LLP

(57) ABSTRACT

An optical system has an expander lens and an objective lens. The following formula is satisfied: $W1_{CM} > W2_{CM}$, where $W1_{CM}$ is a coma aberration ($\lambda$rms) of a converged light spot when an off-axial light flux of a wavelength $\lambda$ (nm) emitted so as to converge at a distance position from the optical axis comes into the objective lens, and $W2_{CM}$ is a coma aberration ($\lambda$rms) of a converged spot when an off-axial light flux of the wavelength $\lambda$ (nm) emitted so as to converge at the distant position distant comes through the expander lens into the objective lens on a condition that the optical axis of the expander lens is arranged so as to conform with the optical axis of the objective lens.

32 Claims, 9 Drawing Sheets

OPTICAL SYSTEM FOR OPTICAL PICKUP APPARATUS

BACKGROUND OF THE INVENTION

The present invention relates to an optical system for an optical pickup apparatus, optical pickup apparatus and optical information recording reproducing apparatus, and particularly to an optical system for the optical pickup apparatus, optical pickup apparatus and optical information recording reproducing apparatus by which the high density optical information recording or reproducing can be attained.

Conventionally, an optical disk represented by a CD (compact disk) or DVD (digital versatile disk) is widely used for the accumulation of the music information or image information or the storage of the digital data such as the program data. Furthermore, as the arrival of the high degree information society, an amount of the managed information is becoming great, and the increase of the capacity of these optical disks is strongly required.

Herein, the increase of the recording capacity (recording density) per unit area in the optical disk can be realized by the engineering by which the spot diameter of the converged light spot obtained from the optical system for the optical pickup apparatus is decreased. As being well known, because this spot diameter is proportional to $\lambda/NA$ (where $\lambda$ is the wavelength of the light source, and NA is numerical aperture of an objective lens), in order to reduce the spot diameter, the reduction of the wavelength of the light source used for the optical pickup apparatus and the increase of the numerical aperture of the objective lens positioned opposite to the optical disk in the optical system for the optical pickup apparatus are effective.

In them, relating to the reduction of the wavelength of the light source, because the research and development of the blue violet semiconductor laser or SHG blue violet laser which generates the light of about 400 nm are rapidly advanced, the practical use of them will be soon. When such a short wavelength light source is used, even when the objective lens of the numerical aperture NA 0.65 which is the same as the conventional DVD of the storage capacity of about 4.7 GB is used, and the optical disk of the diameter 12 cm which is the same as the DVD is used, the recording of the information of about 15 GB can be conducted in such an optical disk.

Further, relating to an increase of the numerical aperture of the objective lens, the research of the objective lens of numerical aperture 0.85 composed of one or two lens group is advanced. When the above-described short wavelength light source and the objective lens of numerical aperture 0.85 are combinedly used, the recording of the information of about 20 to 30 GB is possible onto the optical disk of the diameter 12 cm, and a further increase of density can be attained.

However, when the wavelength of the light source is decreased, and the numerical aperture of the objective lens is increased, there is a problem that the spherical aberration is easily increased due to various error factors and the optical performance is deteriorated. For example, the spherical aberration is directly increased due to the error factors such as the production error of the thickness of the protection layer of the optical dissk, production error of the thickness of the objective lens, or the change of the refractive index due to the temperature change, and also due to the jump between layers of 2 layer disks. Accordingly, as a composition to correct such a spherical aberration, an expander lens composed of 2 lens groups is arranged in the optical path between the light source and the objective lens, and an optical pickup apparatus in which the interval of the lens groups constituting the expander lens is changeably adjusted, or an optical pickup apparatus in which a position of a coupling lens which changes the divergent angle of the diverging light flux emitted from the light source and guides to the objective lens, is changeably adjusted in the optical axis direction, is written in the following patent references.

[Patent Reference 1]
Tokkai 2000-No. 131603

[Patent Reference 2]
Tokkai 2001-No. 324673

However, in these optical pickup apparatus, there is a problem that the coma of the converged light spot is increased due to the relative position deviation of the lens whose position is changeably adjusted by an actuator (hereinafter, the composition lens group of the expander lens whose position is changeably adjusted in the optical axis direction by the actuator, or a coupling lens is called "moveable lens"), and the other lens. Such a problem has an inclination that it is actualized particularly in the case where the size of the optical pickup optical system is reduced when the lens group interval of the expander lens is reduced, the magnification of the expander lens is increased, or the numerical aperture of the coupling lens is increased.

Further, for a personal computer use, or in order to mount in the optical information recording reproducing apparatus for car use, also in the optical pickup apparatus which uses the blue violet light source having a short wavelength and an objective lens having a large numerical aperture, it is presumed that its size reduction is required in near future, however, as described above, there is a problem that, when the size of the optical system for the optical pickup apparatus is reduced, because the light converging performance is greatly deteriorated to the decentering error (deviation) of the movable lens, the allowable range of the decentering error is narrowed, thereby, the production cost of the optical system for the optical pickup apparatus is increased.

SUMMARY OF THE INVENTION

In view of the foregoing problem, the present invention is attained, and the present invention is an optical system for an optical pickup apparatus in which the light source with short wavelength and the objective lens with large numerical aperture are used and which corrects the spherical aberration of the converged light spot by an expander or a coupling lens arranged in the optical path between the light source and objective lens, and the object of the present invention is, even when the movable lens has the decentering error, to provide the optical system for the optical pickup apparatus which has the small deterioration of the light converging performance. Particularly, for the size reduction, even when the lens group interval of the expander lens is reduced, the magnification of the expander lens is increased, and the numerical aperture of the coupling lens is increased, the object of the present invention is to provide the optical system for the optical pickup apparatus in which the deterioration of the light converging performance is small to the decentering error (the decentering error, positional deviation) of the movable lens. Then, the object of the present invention is also to provide the optical pickup apparatus or the optical information recording reproducing apparatus, which is provided with this optical system for the optical pickup apparatus.

DETAILED DESCRIPTION OF THE PREFERRED EMBODIMENT

An optical system for an optical pickup apparatus written in an item 1 is characterized in that: in an optical system for an optical apparatus provided with an expander lens which is composed of at least 2 lens groups and converts the light flux diameter (the outgoing light flux diameter is changed for the incident light flux diameter), and an objective lens which converges the light flux from the expander lens, the coma of the converged light spot when an off-axis light flux (an abaxial light flux) of the wavelength λ (nm) which is converged at the position separated by an arbitrary distance Y1 (mm) within 0.05 mm from the optical axis of the objective lens, is made incident on the objective lens, is $W1_{CM}$ (λ rms), and in the case where all lens groups constituting the expander lens and the objective lens are arranged so that their optical axes are coincident, when the coma of the converged light spot when the off-axis light flux of the wavelength λ (nm) which converges on a position separated by Y1 (mm) in the vertical direction from the optical axis, is made incident on the objective lens through the expander lens, is $w2_{CMCM}$ (λ rms), the following expression is satisfied.

$$W1_{CM} > W2_{CM} \quad (1)$$

Figure 1:
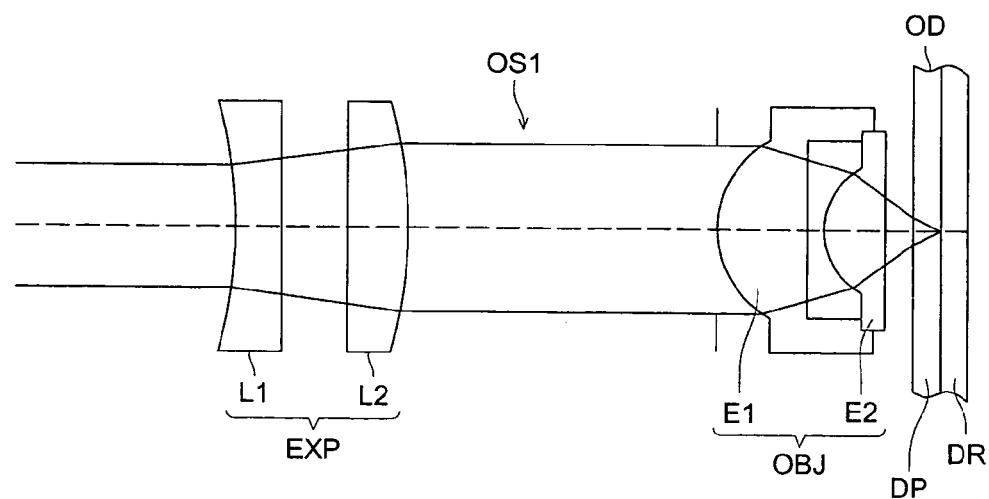
FIG. 1 is an outline sectional view of the optical system for the first optical pickup apparatus according to the present invention.

FIGS. 1–4 are outline sectional views of an optical system for an optical pickup apparatus of the present invention. Referring to FIGS. 1–4, the principle of the present invention will be described by citing an example. The optical system OS1 for the first optical pickup apparatus according to the present invention is, as shown in FIG. 1, composed of an expander lens EXP which converts the diameter of the incident light flux which is projected from the light source, not shown, and is made a parallel light flux by a collimator lens, not shown, and an objective lens OBJ which converges the light flux through this expander lens EXP onto the information recording surface DR through a protective layer DP of the optical disk. The objective lens OBJ is composed of the first lens group E1 arranged on the light source side and the second lens group E2 arranged on an optical disk OD side, and the numerical aperture is not smaller than 0.80.

Each lens group of this objective lens OBJ may also be a single lens, or may also be composed of a plurality of lenses. Further, in the optical system OS1 for this first optical pickup apparatus, the objective lens OBJ is composed of 2 lens groups E1 and E2, however, this objective lens OBJ may also be composed of 1 lens group, or may also be composed of 3 or more lens groups. Further, the expander lens EXP is composed of the first lens group L1 and the second lens group L2. The first lens group L1 and the second lens group L2 may also be a single lens respectively, or may also be composed of a plurality of lenses. Further, the expander lens EXP may also be composed of 3 or more lens groups.

In this optical system OS1 for the first optical pickup apparatus, the first lens group L1 of the expander lens EXP is a concave lens group, and the second lens group L2 is a convex lens group. Further, the expander lens EXP is structured in such a manner that the incident angle of the marginal ray of the light flux which is incident on the objective lens OBJ can be changed when the interval between the first lens group and the second lens group is changed. That is, the expander lens EXP is structured in such a manner that it can act in the direction in which the spherical aberration of the converged light spot on the information recording surface DR is cancelled when the magnification of the objective lens OBJ is changed.

However, in the objective lens having the large numerical aperture in which the wavelength of the blue violet light source is a design wavelength, from the reasons of the spherical aberration correction corresponding to the increase of the numerical aperture, the assurance of the working distance when the recording and/or reproducing is conducted onto the optical disk OD, the assurance of the enough allowable tolerance to the production error, and the size reduction, the correction of the coma in the off-axis characteristic can not be conducted enough and there is a case where the coma remains.

For example, as an objective lens of the numeral aperture of 0.85, an objective lens composed of 1 lens group, or an objective lens composed of a plurality of lens groups of 2 or more, are proposed from each of companies. When the objective lens of such a high numerical aperture is composed of 1 lens group, because there is a tendency that the angle formed between the normal line of the aspheric surface on the light source side and the optical axis is increased, there is a problem that the processing of the optical element molding metallic die by the diamond bite becomes difficult. Further, when the angle is increased, the coma is easily increased by the optical axis dislocation of the mutual optical surfaces and the light converging performance is deteriorated. Accordingly, in the design of the objective lens with the high numerical aperture which is composed of 1 lens group, because it is necessary that the angle is not too large, or the production tolerance to the optical axis dislocation of the mutual optical surfaces is enough secured, there is a case where the coma in the off-axis performance can not sufficiently correct the coma in the off-axis characteristic, and the coma remains.

On the one hand, when the objective lens with such a high numerical aperture is composed of a plurality of lens groups of 2 or more, from the reasons such as the assurance of the working distance when the recording and/or reproducing of the information is conducted onto the optical disk, the assurance of the allowable tolerance to the decentering error when the composition lens groups are assembled, and the size reduction, the coma in the off-axis performance can not sufficiently correct the coma in the off-axis characteristic, and there are many cases where the coma remains.

Figure 2:
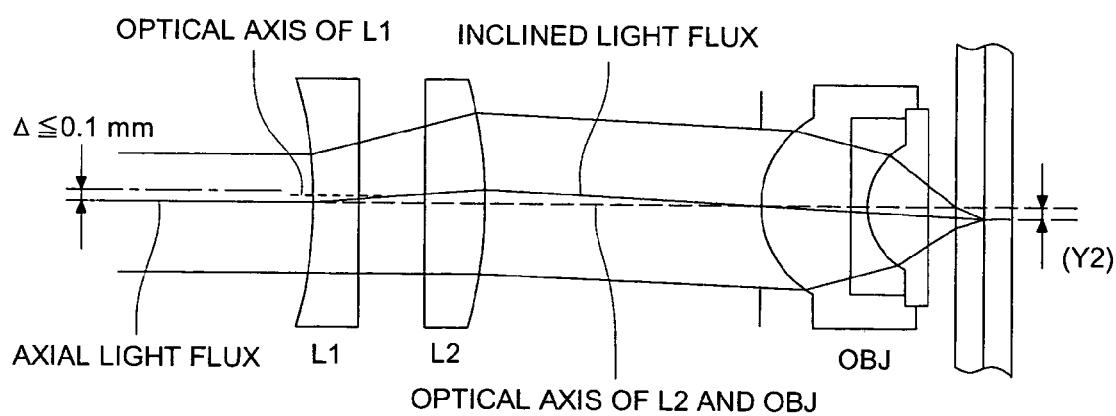
FIG. 2 is an outline sectional view of the optical system for the first optical pickup apparatus according to the present invention.

Herein, in an optical system OS1 for an optical pickup apparatus, as shown in FIG. 2, when the first lens group L1 of the expander lens EXP has the decentering error to the objective lens OBJ, the light flux incident on the objective lens OBJ through the expander lens EXP, is an inclined light flux with an image angle. When the objective lens in which the coma in the off-axis characteristic remains as described above, is used as the objective lens OBJ, by the incidence of this inclined light flux, the coma of the converged light spot is increased, and its light converging performance is deteriorated.

Figure 3:
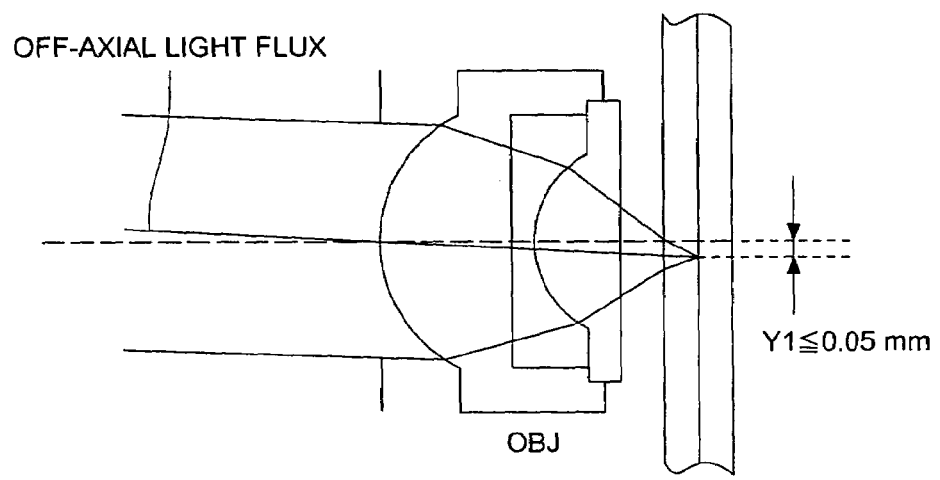
FIG. 3 is an outline sectional view of the optical system for the first optical pickup apparatus according to the present invention.
Figure 4:
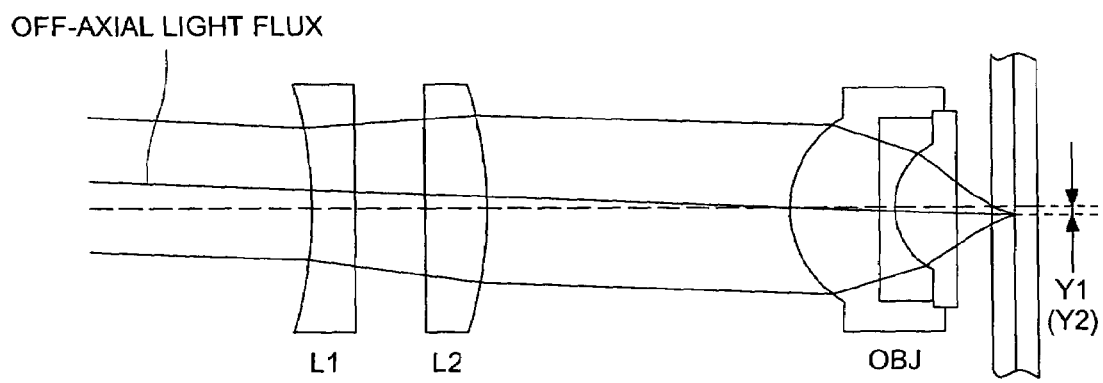
FIG. 4 is an outline sectional view of the optical system for the first optical pickup apparatus according to the present invention.

Accordingly, in the optical system OS1 for the optical pickup apparatus, as shown in FIG. 3, the coma of the converged light spot when the off-axis light flux of the wavelength λ (nm) which is light converged on the separated position by an arbitrary distance Y1 (mm) within 0.05 mm in the vertical direction from the optical axis of the objective lens OBJ, is made incident on the objective lens OBJ, is $W1_{CM}$ (λ rms), and as shown in FIG. 4, in the case where the all lens groups constituting the expander EXP and the objective lens OBJ are arranged so that their optical axes are coincide together, when the coma of the converged light spot when the off-axis light flux of the wavelength λ (nm) which is light converged on a position separated by the distance Y1 (mm) in the vertical direction from this optical axis is made incident on the objective lens OBJ through the expander lens EXP, is $W2_{CM}$ (λ rms), it is structured so that the following expression (1) is satisfied.

$$W1_{CM} > W2_{CM} \quad (1)$$

That is, in an optical system OS1 for this optical pickup apparatus, to the coma $W1_{CM}$ (λ rms) of the off-axis characteristic of an objective lens OBJ single body, it is provided with an expander lens EXP in which the coma $W2_{CM}$ (λ rms) of the off-axis characteristic when this objective lens OBJ and the expander lens EXP are combined, is decreased. In the case where an optical system OS1 for the optical pickup apparatus is structured in this manner, as shown in FIG. 2, when the first lens group L1 of the expander lens EXP has the decentering error to the objective lens OBJ, the increase of the coma of the converged light spot generated when the inclined light flux is incident on the objective lens OBJ, can be suppressed. In order to effectively suppress the increase of such a coma, it is preferable that the optical system OS1 for the optical pickup apparatus is structured so that it satisfies the following expression (1').

$$(2/3) \cdot W1_{CM} > W2_{CM} \quad (1')$$

The optical system for the optical pickup apparatus written in an item 2, is characterized in that: in the optical system for the optical pickup apparatus provided with the expander lens which is composed of at least 2 lens groups and converts the light flux diameter, and the objective lens which converges the light flux from the expander lens, in the case where the image height range is ±H1 (mm) (where H1>0) in which the coma of the converged light spot when the off-axis light flux of the wavelength λ (nm) is made incident on the objective lens becomes within 0.07 λ rms, and in the case where all lens groups constituting the expander lens and the objective lens are arranged so that their optical axes are coincide together, when the image height range is ±H2 (mm) (where, H2>0) in which the coma of the converged light spot when the off-axis light flux of the wavelength λ (nm) is made incident on the objective lens through the expander lens, is within 0.07 λ rms, it satisfies the following expression.

$$H2 > H1, \quad (2)$$

Relating to the technological idea written in an item 1, when it is looked from another viewpoint, it is the description written in an item 2. That is, in the optical system OS1 for the optical pickup apparatus in FIG. 1, the image height range is ±H1 (mm) (where, H1>0) in which the coma of the converged light spot when the off-axis light flux of the wavelength λ (nm) is made incident on the objective lens OBJ is within 0.07 λ rms, and in the case where the first lens group L1, the second lens group L2 constituting the expander lens EXP and the objective lens OBJ are arranged so that their optical axes are coincident, when the image height range is ±H2 (mm) (where, H2>0) in which the coma of the converged light spot when the off-axis light flux of the wavelength λ (nm) is made incident on the objective lens OBJ through the expander lens EXP becomes within 0.07 λ rms, because it is structured so that the following expression is satisfied, when the first lens group L1 of the expander lens EXP has the decentering error to the objective lens OBJ, the increase of the coma of the converged light spot generated when the inclined light flux is incident on the objective lens OBJ, can be suppressed.

$$H2 > H1 \quad (2)$$

Particularly, as shown in FIG. 2, in the case where the first lens group L1 of the expander lens EXP has the decentering error to the objective lens OBJ, in order to more effectively suppress the increase of the coma of the converged light spot generated when the inclined light flux is incident on the objective lens OBJ, it is preferable that the optical system OS1 for the optical pickup apparatus is structured as written in an item 3.

The optical system for the optical pickup apparatus written in the item 3 is characterized in that: in the lens group constituting the expander lens, when an arbitrary lens group and the objective lens are arranged so that their optical axes are coincident with each other, and the other lens groups than the arbitrary lens group are arranged under an eccentric situation by an arbitrary amount Δ (mm) within 0.1 mm in the vertical direction from the optical axis, in the case where the coma of the converged light spot when the axial light flux of the wavelength λ (nm) is made incident on the objective lens through the expander lens is $W3_{CM}$ (λ rms), and the distance measured in the vertical direction from the optical axis of the converged light spot is Y2 (mm), and in the case where all lens groups constituting the expander lens and the objective lens are arranged so that their axes are coincident with together, the coma of the converged light spot when the off-axis light flux of the wavelength λ which is light converged on a position separated from the optical axis in the vertical direction by the distance Y2 (mm), is made incident on the objective lens through the expander lens, is $W4_{CM}$ (λ rms), it satisfies the following expression.

$$|(W3_{CM}-W4_{CM})/W3_{CM}|<0.5 \quad (3)$$

That is, in the lens group constituting the expander lens EXP, the arbitrary lens group (in FIG. 2, it corresponds to the second lens group L2) and the objective lens OBJ are arranged so that their optical axes are coincident, and when the other lens groups than the arbitrary lens group (in FIG. 2, it corresponds to the first lens group L1) are arranged under the eccentric situation by an arbitrary amount Δ (mm) within 0.1 mm in the vertical direction from the optical axis, the coma of the converged light spot when the axial light flux of the wavelength λ (nm) is made incident on the objective lens OBJ through the expander lens EXP, is $W3_{CM}$ (λ rms), and the distance measured in the vertical direction from the optical axis of the converged light spot is Y2 (mm), and as shown in FIG. 4, in the case where all lens groups constituting the expander lens EXP and the objective lens OBJ are arranged so that their optical axes are coincident with each other, when the coma of the converged light spot when the off-axis light flux of the wavelength λ (nm) which is light converged on a position separated by the distance Y2 (mm) in the vertical direction from the optical axis, is made incident on the objective lens OBJ through the expander lens EXP, is $W4_{CM}$ (λ rms), by satisfying the above expression (3), when the first lens group L1 of the expander lens EXP has the decentering error to the objective lens OBJ, the increase of the coma of the converged light spot generated when the inclined light flux is incident on the objective lens OBJ can be more effectively suppressed.

As described above, because the optical system OS1 for the optical pickup apparatus according to the present invention is structured so that the above expressions (1) to (3) are satisfied, as shown in FIG. 2, when the first lens group L1 of the expander lens EXP has the decentering error to the objective lens OBJ, because the coma generated in the objective lens OBJ when the inclined light flux is incident on the objective lens OBJ, and the coma decentering error generated in the expander lens itself are effectively cancelled, the allowable tolerance to the decentering error of the first lens group L1 can be largely secured.

In the above description, the description in the case where the first lens group L1 has the decentering error to the objective lens OBJ, is made, however, when the optical system OS1 for the optical pickup apparatus is structured so that above expressions (1) to (3) are satisfied, even when the second lens group L2 has the decentering error to the objective lens OBJ, the increase of the coma of the converged light spot can be effectively suppressed.

As described above, because this optical system OS1 for the optical pickup apparatus is structured so that the above expressions (1) to (3) are satisfied, when the position of the movable lens group is changed by an actuator, even when it has the decentering error to the objective lens OBJ, the increase of the coma of the converged light spot can be effectively suppressed. As the result, because the requirement accuracy to the actuator to change the position of the movable lens group is moderate, the production cost of the optical pickup apparatus on which the optical system OS for the optical pickup apparatus is mounted, can be reduced.

In the optical system for the optical pickup apparatus written in an item 4, when the expander lens has at least one aspheric surface, the effect of the present invention can be more effectively shown.

In the optical system OS1 for this optical pickup apparatus, when the lens group constituting the expander lens EXP has the decentering error to the objective lens OBJ, it is necessary that the coma is intentionally generated by the expander lens EXP itself. Therefore, it is preferable that the expander lens EXP has at least one aspheric surface in the lens group constituting the expander lens EXP. Then, in order to produce the aspheric surface at the low cost, it is preferable that the composition lens group of the expander lens EXP whose optical surface is the aspheric surface is the plastic lens.

The optical system for the optical pickup apparatus written in an item 5, is characterized in that: the numerical aperture of the objective lens is not smaller than 0.8, and the expander lens can change the incident angle of the marginal ray of the light flux incident on the objective lens when the interval between the lens groups constituting the expander lens is changed.

As described above, when the numerical aperture of the objective lens is increased more than 0.8, the spherical aberration is easily increased due to various error factors and the optical performance is deteriorated. In this optical system OS1 for the optical pickup apparatus, because, when the interval between the composition lens groups of the expander lens EX is changed, the expander lens is structured so that it can change the incident angle of the marginal ray of the light flux incident on the objective lens, such a spherical aberration can be corrected.

The optical system for the optical pickup apparatus written in an item 6 is characterized in that: the objective lens is structured by at least 2 lens groups.

The optical system for the optical pickup apparatus written in an item 7 can provide a compact structure when the whole length of the expander lens measured on the optical axis is not larger than 3 mm. Hereupon, the whole length used herein is the length of the expander lens in the situation that the interval between the lens groups constituting the expander lens is adjusted so that the parallel light flux is projected when the parallel light flux is made incident.

The optical system for the optical pickup apparatus written in an item 8 is characterized in that: when the diameter of the light flux incident on the expander lens is D1 (mm), and the diameter of the light flux projected from the expander lens is D2 (mm), the magnification γ of the expander lens satisfies the following expression.

$$\gamma=D2/D1>1.2 \quad (3a)$$

When the magnification of the expander lens is set in this manner, because the size of the optical system (a collimator lens or polarized light beam splitter)between the light source and the expander lens can be reduced, the optical system for the optical pickup apparatus which is compact as a whole, can be provided.

As described above, for the down-sizing, in the case where the whole length measured on the optical axis of the expander lens EXP is reduced, or the magnification of the expander lens EXP is increased, when the first lens group L1 of the expander lens EXP has the decentering error to the objective lens OBJ, the incident angle of the inclined light flux incident on the objective lens OBJ is increased, however, even in such a case, when the optical system OS1 for the optical pickup apparatus is structured so that the expressions (1) to (3) are satisfied, the allowable tolerance to the decentering error of the first lens group L1 of the expander lens EXP can be largely secured.

The optical pickup apparatus written in an item 9 is characterized in that: in the optical pickup apparatus having the light source which projects the light flux of the wavelength λ (nm), and the optical system for the optical pickup apparatus which conducts recording and/or reproducing of the information by light converging the light flux projected from the light source onto the information recording surface of the optical information recording medium, the optical system for the optical pickup apparatus is provided with the objective lens which is arranged oppositely to the optical information recording medium, and whose numerical aperture is not smaller than 0.8, and an expander lens which is arranged in the optical path between the objective lens and the light source and objective lens, and structured by at least 2 lens groups; at least one lens group in the lens groups constituting the expander lens is movably structured in the optical axis direction, and when the lens group which is movable in the optical axis direction is moved in the optical axis direction, it functions in such a manneer that the spherical aberration correction of the converged light spot which is light converged on the information recording surface, is conducted by changing the interval between lens groups constituting the expander lens; the coma of the converged light spot when the off-axis light flux of the wavelength λ (nm) which is light converged on a position separated from the optical axis of the objective lens by an arbitrary distance Y1 (mm) within 0.05 mm in the vertical direction, is made incident on the objective lens, is $W1_{CM}$ (λ rms); and in the case where all lens groups constituting the expander lens and the objective lens are arranged so that their optical axes are coincident with each other, when the coma of the converged light spot when the off-axis of the wavelength λ (nm) which is light converged on a position separated from the optical axis by the distance Y1 (mm) in the vertical direction, is made incident on the objective lens through the expander lens, is $W2_{CM}$ (λ rms), it satisfies the following expression.

$$W1_{CM} > W2_{CM} \quad (4)$$

The present invention attains the same effect as the invention written in an item 1.

The optical pickup apparatus written in an item 10 is characterized in that: in the optical pickup apparatus having the light source which projects the light flux of the wavelength λ (nm), and the optical system for the optical pickup apparatus which conducts recording and/or reproducing of the information by light converging the light flux projected from the light source onto the information recording surface of the optical information recording medium, the optical system for the optical pickup apparatus is provided with the objective lens which is arranged oppositely to the optical information recording medium, and whose numerical aperture is not smaller than 0.8, and the expander lens which is arranged in the optical path between the light source and the objective lens, and structured by at least 2 lens groups; at least one lens group in the lens groups constituting the expander lens is movably structured in the optical axis direction, and when the lens group which is movable in the optical axis direction is moved in the optical axis direction, it functions in such a manner that the spherical aberration correction of the converged light spot which is light converged on the information recording surface, is conducted by changing the interval between lens groups constituting the expander lens; and when the image height range in which the coma of the converged light spot when the off-axis light flux of the wavelength λ (nm) is made incident on the objective lens, is within 0.07 (λ rms), is ±H1 (mm), (where, H1>0); and when all lens groups constituting the expander lens and the objective lens are arranged so that their optical axes are coincident with each other, when the image height range in which the coma of the converged light spot when the off-axis light flux of the wavelength λ (nm) is made incident on the objective lens through the expander lens, is within 0.07 λ rms, is ±H2 (mm), (where, H2>0), it satisfies the following expression.

$$H2 > H1 \quad (5)$$

The present invention attains the same effect as the invention written in an item 2.

The optical pickup apparatus written in an item 11 is characterized in that: in the lens groups constituting the expander lens, when the lens group other than lens groups which are movable in the in the optical axis direction and the objective lens are arranged so that their optical axes are coincident with each other, and the lens groups which are movable in the optical axis direction are arranged under the eccentric situation by an arbitrary amount Δ (mm) within 0.1 mm in the vertical direction from the optical axis, the coma of the converged light spot when the axial light flux of the wavelength λ (nm) is made incident on the objective lens through the expander lens, is $W3_{CM}$ (λ rms), and the distance measured in the vertical direction from the optical axis of the converged light spot is Y2 (mm), and when all lens groups constituting the expander lens and the objective lens are arranged so that their axes are coincident with each other, the coma of the converged light spot when the off-axis light flux of the wavelength λ (nm) which is light converged on a position separated by the distance Y2 (mm) in the vertical direction from the optical axis, is made incident on the objective lens through the expander lens, is $W4_{CM}$ (λ rms), it satisfies the following expression.

$$|(W3_{CM} - W4_{CM})/W3_{CM}| < 0.5 \quad (6)$$

The present invention attains the same effect as the invention written in an item 3.

The optical pickup apparatus written in an item 12 is characterized in that: the expander lens has at least one aspheric surface. The present invention attains the same effect as the invention written in an item 4.

The optical pickup apparatus written in an item 13 is characterized in that: the objective lens is structured by at least 2 lens groups. The present invention attains the same effect as the invention written in an item 6.

The optical pickup apparatus written in an item 14 is characterized in that: the whole length measured on the optical axis of the expander is not larger than 3 mm. The present invention attains the same effect as the invention written in an item 7.

The optical pickup apparatus written in an item 15 is characterized in that: when the diameter of the light flux incident on the expander lens is D1 (mm), and the diameter of the light flux projected from the expander lens is D2 (mm), the magnification γ of the expander lens satisfies the following expression.

$$\gamma = D2/D1 > 1.2 \quad (6a)$$

The present invention attains the same effect as the invention written in an item 8.

The optical information recording reproducing apparatus written in an item 16 is characterized in that: it has the optical pickup apparatus written in any one of items 9 to 14, and an optical information recording medium support means by which the optical information recording medium is supported at the position at which the recording and/or reproducing of the information signal is possible by the optical pickup apparatus. The "optical information recording reproducing apparatus" means an apparatus by which the information signal relating to the voice or image, projected image is recorded, and/or reproduced by using the light.

The optical system for the optical pickup apparatus written in an item 17 is characterized in that: in the optical system for the optical pickup apparatus provided with the coupling lens which changes the divergent angle of the incident light flux, and the objective which converges the light flux from the coupling lens, when the coma of the converged light spot when the off-axis light flux of the wavelength λ (nm) which is light converged on a position separated by an arbitrary distance Y1 (mm) within 0.05 mm in the vertical direction from the optical axis of the objective lens is made incident on the objective lens, is $W1_{CM}$ (λ rms), and when the coupling lens and the objective lens are arranged so that their optical axes are coincident with each other, and when the coma of the converged light spot when the off-axis light flux of the wavelength λ (nm) which is light converged on a position separated by the distance Y1 (mm) in the vertical direction from the optical axis is made incident on the objective lens through the coupling lens, is $W2_{CM}$ (λ rms), it satisfies the following expression.

$$W1_{CM} > W2_{CM} \quad (7)$$

Figure 6:
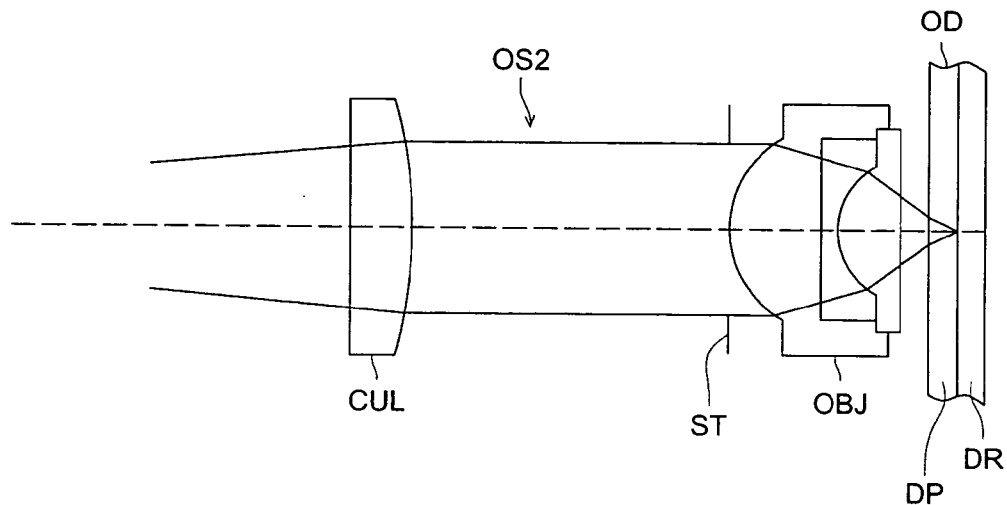
FIG. 6 is an outline sectional view of the optical system for the second optical pickup apparatus according to the present invention.

FIGS. 6–9 are outline sectional views of the optical system for the optical pickup apparatus of the present invention. Referring to FIGS. 6–9, the principle of the present invention will be described below by showing the example. The optical system OS2 for the second optical pickup apparatus according to the present invention is structured, as shown in FIG. 6, by a coupling lens CUL by which the diverging angle of the diverging light flux projected from the light source, not shown, is changed, and guided to the objective lens OBJ, and the objective lens OBJ which converges the light flux through this coupling lens CUL on the information recording surface DR through the protective layer DP of the optical disk OD. The coupling lens CUL may also be a collimator lens which collimates the diverging light flux from the light source into the parallel light flux and guides to the objective lens OBJ, or a lens which reduces the diverging angle of the diverging light flux from the light source, and guides to the objective lens OBJ as a moderate diverging light flux, or a lens which converts the diverging light flux from the light source into the converging light flux and guides to the objective lends OBJ. Further, the coupling lens CUL may also be a lens composed of one lens group, or composed of a plurality of lens groups. In the example used herein and the example 2 which will be described later, the coupling lens CUL is a collimator lens composed of one lens group. Then, the coupling lens CUL is structured so that the incident angle of the marginal light ray of the light flux incident on the objective lens can be changed when the interval to the objective lens OBJ is changed. That is, when the magnification of the coupling lens CUL and the objective lens OBJ is changed, it is structured so that it can act in the direction in which the spherical aberration of the converged light spot on the information recording surface DR is cancelled.

Because the objective lens OBJ of the optical system OS2 for this optical pickup apparatus is the same as the objective lens OBJ of the optical system OS1 for the above-described optical pickup apparatus, the detailed description is omitted.

Figure 7:
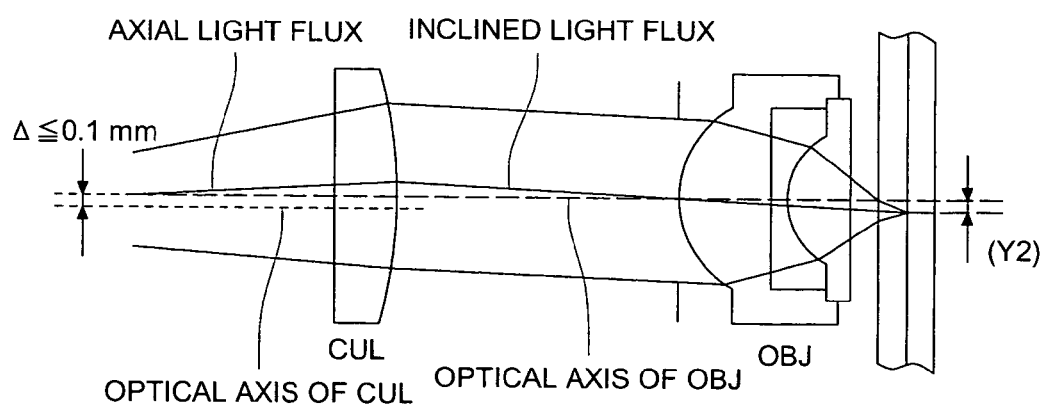
FIG. 7 is an outline sectional view of the optical system for the second optical pickup apparatus according to the present invention.

In the optical system OS2 for the optical pickup apparatus, as shown in FIG. 7, when the coupling lens CUL has the decentering error to the objective lens OBJ, the light flux incident on the objective lens OBJ through the coupling lens CUL is the included light flux with the image angle. When, as the objective lens OBJ, the objective lens in which the coma in the off-axis characteristic remains as described above, is used, the coma of the converged light spot is increased by the incidence of this inclined light flux and its light converging performance is deteriorated.

Figure 8:
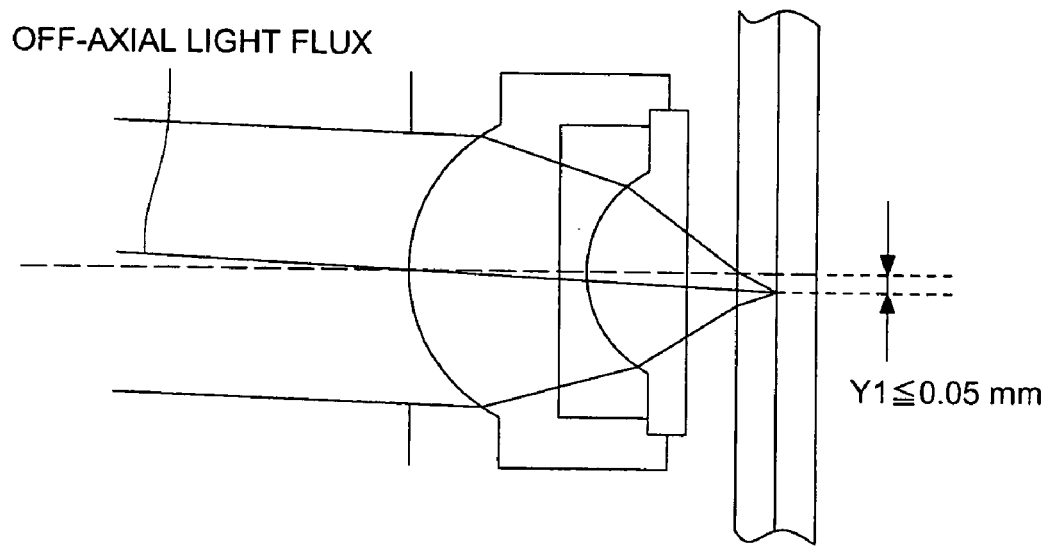
FIG. 8 is an outline sectional view of the optical system for the second optical pickup apparatus according to the present invention.
Figure 9:
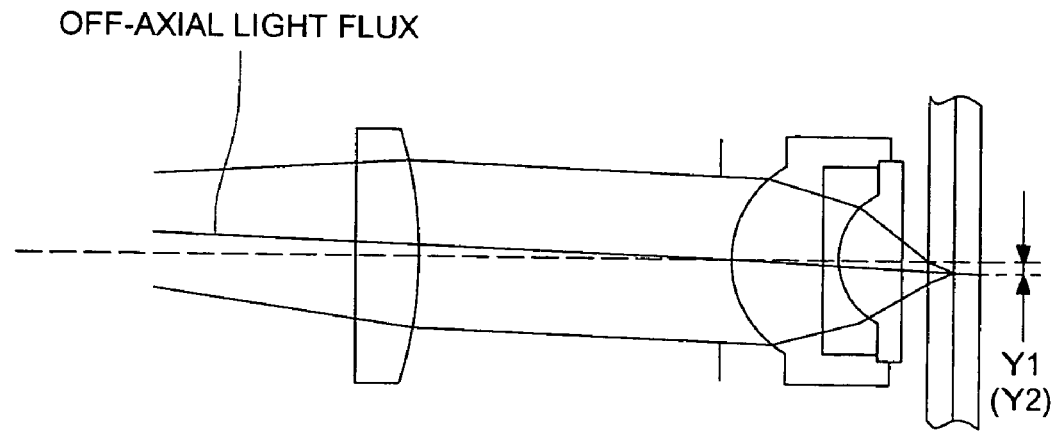
FIG. 9 is an outline sectional view of the optical system for the second optical pickup apparatus according to the present invention.

Accordingly, in the optical system OS for this optical pickup apparatus, as shown in FIG. 8, the coma of the converged light spot when the off-axis light flux of the wavelength λ (nm) which is light converged on a position separated by an arbitrary distance Y1 (mm) within 0.05 mm in the vertical direction from the optical axis of the objective lens OBJ, is made incident on the objective lens OBJ, is $W1_{CM}$ (λ rms), and as shown in FIG. 9, when the coupling lens CUL and the objective lens OBJ are arranged so that their optical axes are coincident with each other, when the coma of the converged light spot when the off-axis light flux of the wavelength λ (nm) which is light converged on a position separated by the distance Y1 (mm) in the vertical direction from this optical axis, is made incident on the objective lens OBJ through the coupling lens CUL, is $W2_{CM}$ (λ rms), it is structured so as to satisfy the following expression (7).

$$W1_{CM} > W2_{CM} \quad (7)$$

That is, in the optical system OS2 for this optical pickup apparatus, to the coma $W1_{CM}$ (λ rms) of the off-axis characteristic of the objective lens OBJ single body, it is provided with the coupling lens CUL in which the coma $W2_{CM}$ (λ rms) of the off-axis characteristic when this objective lens OBJ and the coupling lens CUL are combined is reduced. When the optical system OS2 for the optical pickup apparatus is structured in this manner, as shown in FIG. 7, when the coupling lens CUL has the decentering error to the objective lens OBJ, the increase of the coma of the converged light spot generated when the inclined light flux is incident on the objective lens OBJ can be suppressed. In order to effectively suppress the increase of such a coma, it is preferable that the optical system OS2 for the optical pickup apparatus is structured so that it satisfies the following expression (7').

$$(2/3) \cdot W1_{CM} > W2_{CM} \quad (7')$$

The optical system for the optical pickup apparatus written in an item 18 is characterized in that: in the optical system for the optical pickup apparatus provided with the coupling lens which changes the divergent angle of the incident light flux and the objective lens which converges the light flux from the coupling lens, when the image height range in which the coma of the converged light spot when the off-axis light flux of the wavelength λ (nm) is made incident on the objective lens, is within 0.07 λ rms, is ±H1 (mm) (where, H1>0), and when the coupling lens and the objective lens are arranged so that their optical axes are coincident with each other, when the image height range in which the coma of the converged light spot when the off-axis light flux of the wavelength λ (nm) is made incident on the objective lens through the coupling lens, is within 0.07 λ rms, is ±H2 (mm) (where, H2>0), it satisfies the following expression.

$$H2 > H1 \quad (8)$$

Relating to the technological idea written in an item 17, when an another view is taken, it is as written in an item 18. That is, in the optical system OS2 for this optical pickup apparatus, when the image height in which the coma of the converged light spot when the off-axis light flux of the wavelength λ (nm) is made incident on the objective lens OBJ is within 0.07 λ rms, is ±H1 (mm) (where, H1>0), and when the coupling lens CUL and the objective lens OBJ are arranged so that their optical axes are coincident with each other, when the image height range in which the coma of the converged light spot when the off-axis light flux of the wavelength λ (nm) is made incident on the objective lens OBJ through the coupling lens CUL is within 0.07 λ rms, is ±H2 (mm) (where, H2>0), because it is structured so that it satisfies the above expression (8), when the coupling lens CUL has the decentering error to the objective lens OBJ, the increase of the coma of the converged light spot generated when the inclined light flux is incident on the objective lens OBJ, can be suppressed.

Further, as shown in FIG. 7, when the coupling lens CUL has the decentering error to the objective lens OBJ, in order to attain that the increase of the coma of the converged light spot generated when the inclined light flux is incident on the objective lens is effectively suppressed, it is preferable that the optical system OS2 for the optical pickup apparatus is structured as written in an item 19.

The optical system for the optical pickup apparatus written in an item 19 is characterized in that: when the coupling lens is arranged under the eccentric situation by an arbitrary amount Δ (mm) within 0.1 mm in the vertical direction from the optical axis of the objective lens, when the coma of the converged light spot when the axial light flux of the wavelength λ (nm) is made incident on the objective lens through the coupling lens is $W3_{CM}$ (λ rms) and the distance measured in the vertical direction from the optical axis of the converged light spot is Y2 (mm), and when the coupling lens and the objective lens are arranged so that their optical axes are coincident with each other, when the coma of the converged light spot when the off-axis light flux of the wavelength λ (nm) which is light converged on a position separated by the distance Y2 (mm) in the vertical direction from the optical axis is made incident on the objective lens through the coupling lens is $W4_{CM}$ (λ rms), it satisfies the following expression.

$$|(W3_{CM} - W4_{CM})/W3_{CM}| < 0.5 \quad (9)$$

As shown in FIG. 7, when the coupling lens CUL is arranged under the eccentric situation by an arbitrary amount Δ (mm) within 0.1 mm in the vertical direction from the optical axis, the coma of the converged light spot when the axial light flux of the wavelength λ (nm) is made incident on the objective lens OBJ through the coupling lens CUL is $W3_{CM}$ (λ rms), and the distance measured in the vertical direction from the optical axis of the converged light spot is Y2 (mm), and as shown in FIG. 9, when the coupling lens CUL and the objective lens OBJ are arranged so that their optical axes are coincident with each other, in the case where the coma of the converged light spot when the off-axis light flux of the wavelength λ (nm) which is light converged on a position separated by the distance Y2 (mm) in the vertical direction from the optical axis, is made incident on the objective lens OBJ through the coupling lens CUL, is $W4_{CM}$ (λ rms), when it satisfies the above expression (9), when the coupling lens CUL has the decentering error to the objective lens OBJ, the increase of the coma of the converged light spot generated when the inclined light flux is incident on the objective lens OBJ, can be more effectively suppressed.

As described above, because the optical system OS2 for the optical pickup apparatus according to the present invention is structured so as to satisfy the above-described expressions (7) to (9), as shown in FIG. 7, when the coupling lens CUL has the decentering error to the objective lens OBJ, because the coma generated in the objective lens OBJ when the inclined light flux is incident on the objective lens OBJ and the coma decentering error generated by the coupling lens itself are effectively cancelled, the allowable tolerance to the decentering error of the coupling lens CUL can be largely secured.

Particularly, for the down-sizing, in the case where the numerical aperture of the coupling lens CUL is increased, when the coupling lens CUL has the decentering error to the objective lens OBJ, the incident angle of the inclined light flux incident on the objective lens is increased, however, even in such a case, when the optical system OS2 for the optical pickup apparatus is structured so ass to satisfy the above-described expressions (7) to (9), the allowable tolerance to the decentering error of the coupling lens CUL can be largely secured.

The optical system for the optical pickup apparatus written in an item 20 is characterized in that: the coupling lens has at least one aspheric surface.

In the optical system OS2 for this optical pickup apparatus, when the coupling lens CUL has the decentering error to the objective lens OBJ, it is necessary that the coupling lens itself intentionally generates the coma. Therefore, it is preferable that the coupling lens CUL has at least one aspheric surface in the composition lens group. Then, in order to produce the aspheric surface at low cost, it is preferable that the coupling lens CUL whose optical surface is the aspheric surface is the plastic lens.

The optical system for the optical pickup apparatus written in an item 21 is characterized in that: the numerical aperture of the objective lens is not smaller than 0.8, and the coupling lens can change the incident angle of the marginal light ray of the light flux incident on the objective lens when the interval to the objective lens is changed.

As described above, when the numerical aperture of the objective lens OBJ is increased to not smaller than 0.8, the spherical aberration is easily increased due to various error factors and the optical performance is deteriorated. In this optical system OS2 for the optical pickup apparatus, when the interval between the coupling lens CUL and the objective lens OBJ is changed, because it is structured in such a manner that the incident angle of the marginal light ray of the light flux incident on the objective lens OBJ can be changed, such a spherical aberration can be corrected. Then, because this optical system OS2 for the optical pickup apparatus is structured so that the above-described expressions (7) to (9) are satisfied, when the position of the objective lens OBJ is changed by an actuator, even when it has the decentering error to the objective lens OBJ, the increase of the coma of the converged light spot can be effectively suppressed. As the result, because the required accuracy for the actuator to change the position of the objective lens OBJ is not too severe, the production cost of the optical pickup apparatus in which the optical system OS2 for the optical pickup apparatus is mounted, can be reduced.

The optical system for the optical pickup apparatus written in an item 22 is characterized in that: the objective lens is structured by at least 2 lens groups.

The optical system for the optical pickup apparatus written in an item 23 is characterized in that: the absolute value of the ratio of the numerical aperture of the coupling lens to the numerical aperture of the objective lens is not smaller than 0.1.

The optical pickup apparatus written in an item 24 is characterized in that: in the optical pickup apparatus having the light source which projects the light flux of the wavelength λ (nm), and the optical system for the optical pickup apparatus which records and/or reproduces the information by light converging the light flux projected from the light source onto the information recording surface of the optical information recording medium, the optical system for the optical pickup apparatus is provided with the objective lens which is arranged opposite to the optical information recording medium, and the numerical aperture is not smaller than 0.8, and the coupling lens which is arranged between in the optical path between the light source and the objective lens, and changes the divergent angle of the diverging light flux projected from the light source, and the coupling lens is structured so that it can move in the optical axis direction, and by the coupling lens being moved in the optical axis direction, when the interval to the objective lens is changed, it functions in such a manner that the spherical aberration correction of the converged light spot which is converged on the information recording surface is conducted; and the coma of the converged light spot when the off-axis light flux of the wavelength λ (nm) which is light converged on a position separated by the arbitrary distance Y1 (mm) within 0.05 mm in the vertical direction from the optical axis of the objective lens is made incident on the objective lens, is $W1_{CM}$ (λ rms), and when the coupling lens and the objective lens are arranged so that their optical axes are coincident with each other, when the coma of the converged light spot when the off-axis light flux of the wavelength λ (nm) which is light converged on a position separated by the distance Y1 (mm) in the vertical direction from the optical axis is made incident on the objective lens through the coupling lens, is $W2_{CM}$ (λ rms), it satisfies the following expression.

$$W1_{CM} > W2_{CM} \quad (10)$$

The present invention shows the same effect as the invention written in an item 17.

The optical pickup apparatus written in an item 25 is characterized in that: in the optical pickup apparatus having the light source which projects the light flux of the wavelength λ (nm), and the optical system for the optical pickup apparatus which records and/or reproduces the information by converging the light flux projected from the light source on the information recording surface of the optical information recording medium, the optical system for the optical pickup apparatus is provided with the objective lens which is arranged opposite to the optical information recording medium and whose numerical aperture is not smaller than 0.8, and the coupling lens which is arranged in the optical path between the light source and the objective lens and changes the divergent angle of the diverging light flux projected from the light source, and the coupling lens is structured so as to be movable in the optical axis direction, and when the coupling lens moves in the optical axis direction, by changing the interval to the objective lens, it functions in such a manner that the spherical aberration correction of the converged light spot which is light converged on the information recording surface is conducted, and the image height range in which the coma of the converged light spot when the off-axis light flux of the wavelength λ (nm) is made incident on the objective lens is within 0.07 λ rms is ±H1 (mm) (where, H1>0), and when the coupling lens and the objective lens are arranged so that their optical axes are coincident with each other, when the image height range in which the coma of the converged light spot when the off-axis light flux of the wavelength λ (nm) is made incident on the objective lens through the coupling lens is within 0.07 λ rms, is ±H2 (mm) (where, H2>0), it satisfies the following expression.

$$H2 > H1 \quad (11)$$

The present invention shows the same effect as the invention written in an item 18.

The optical pickup apparatus written in an item 26 is characterized in that: when the coupling lens is arranged under the eccentric situation of an arbitrary amount Δ (mm) within 0.1 mm in the vertical direction from the optical axis of the objective lens, the coma of the converged light spot when the axial light flux of the wavelength λ (nm) is made incident on the objective lens through the coupling lens, is $W3_{CM}$ (λ rms), and the distance measured in the vertical direction from the optical axis of the converged light spot is Y2 (mm), and when the coupling lens and the objective lens are arranged so that their optical axes are coincident with each other, when the coma of the converged light spot when the off-axis light flux of the wavelength λ (nm) which is light converged on a position separated by the distance Y2 (mm) in the vertical direction from the optical axis is made incident on the objective lens through the coupling lens, is $W4_{CM}$ (λ rms), it satisfies the following expression.

$$|(W3_{CM} - W4_{CM})/W3_{CM}| < 0.5 \quad (12)$$

The present invention shows the same effect as the invention written in an item 19.

The optical pickup apparatus written in an item 27 is characterized in that: the coupling lens has at least one aspheric surface. The present invention shows the same effect as the invention written in an item 20.

The optical pickup apparatus written in an item 28 is characterized in that: the objective lens is structured by at least 2 lens groups. The present invention shows the same effect as the invention written in an item 22.

The optical pickup apparatus written in an item 29 is characterized in that: an absolute value of the ratio of the numerical aperture of the coupling lens to the numerical aperture of the objective lens is not smaller than 0.1. The present invention shows the same effect as the invention An optical information recording reproducing apparatus written in an item 30 is characterized in that: it has the optical pickup apparatus written in any one of items 24 to 29 and an optical information recording medium supporting means for supporting the optical information recording medium at a position at which the information signal can be recorded and/or reproduced by the optical pickup apparatus.

Hereupon, in the present specification, the objective lens designates, in a narrow meaning, a lens having the light converging action which is arranged opposite to the optical information recording medium at a most optical information recording medium side in the condition in which the optical information recording medium (optical disk) is loaded in the optical pickup apparatus, and in a wide meaning, designates a lens which can be driven in at least its optical axis direction together with the lens, by an actuator. Accordingly, in the present specification, the numerical aperture of the objective lens designates a numerical aperture of the optical surface positioned at the most optical information recording medium side of the objective lens, and the numerical aperture regulated by the regulation of respective optical information recording media, or the numerical aperture having the diffraction limit performance (also called the image side numerical aperture) by which, for respective optical information recording media, corresponding to the wavelength of the using light source, the spot diameter necessary for the recording and/or reproducing can be obtained.

Further, in the present specification, the recording of the information means that the information is recorded on the information recording surface of the above-described optical information recording medium. Further, in the present specification, the reproducing of the information means that the information recorded on the information recording surface of the above-described optical information recording medium is reproduced. The objective lens according to the present invention may also be a lens which is used for only the recording or reproducing, or a lens used for both the recording and reproducing. Further, it may also be a lens used for the recording on a certain optical information recording medium, or for reproducing for another optical information recording medium, or for recording or reproducing for a certain optical information recording medium, and for recording and reproducing for another optical information recording medium. Hereupon, the reproducing called herein includes a case where the information is only read.

Further, in the present specification, the axial light flux designates the light flux projected from the light source arranged on the optical axis of the objective lens, and the off-axis light flux designates the light flux projected from the light source arranged at a position separated in the vertical direction from the optical axis of the objective lens.

Figure 5:
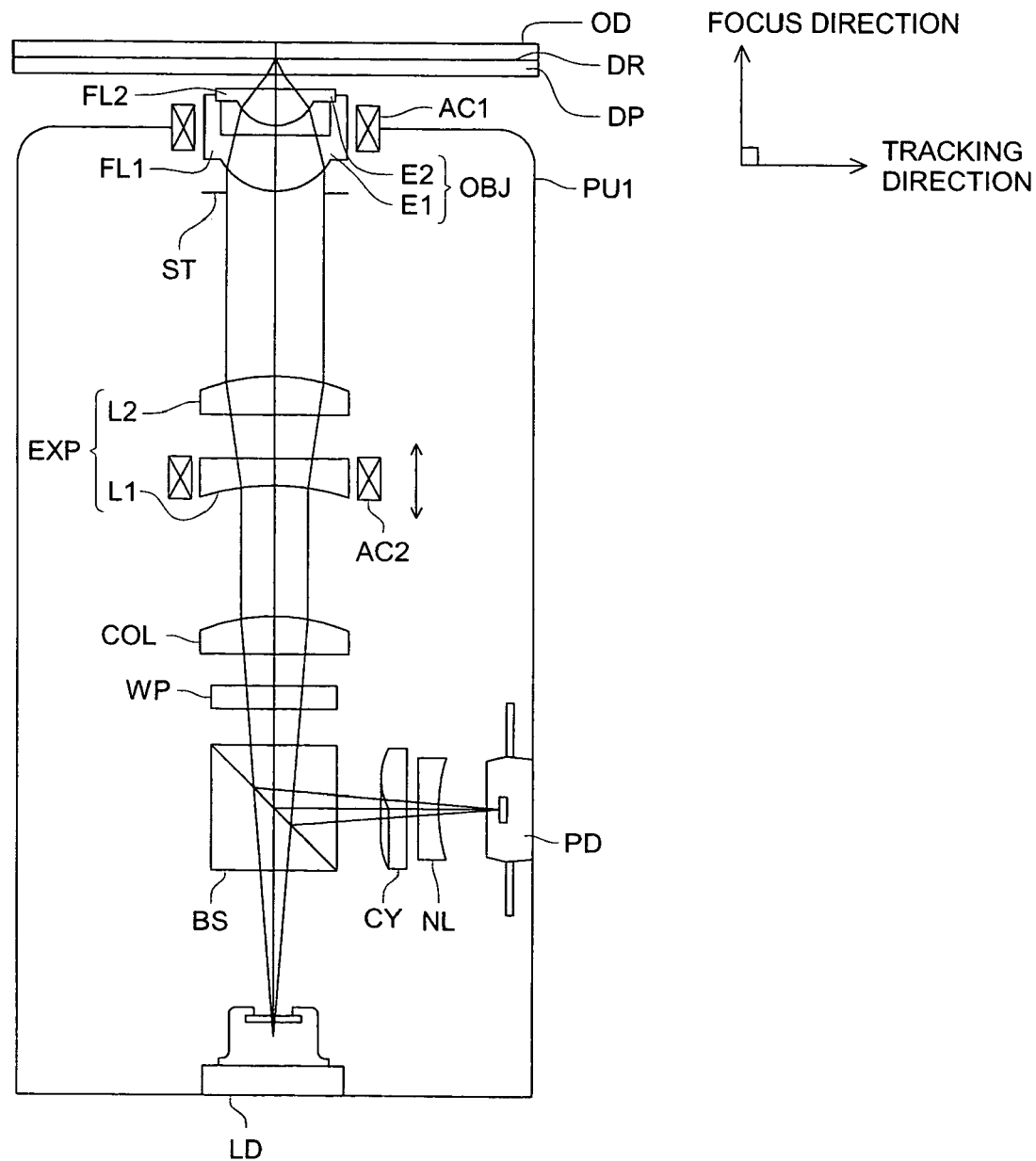
FIG. 5 is a view generally showing a composition of the optical pickup apparatus according to the first embodiment.

Referring to the drawings, the embodiment of the objective lens of the optical pickup apparatus according to the present invention will be described below. FIG. 5 is an outline sectional view of the optical system for the optical pickup apparatus according to the first embodiment. The optical pickup apparatus PU1 in which the first optical pickup optical system OS1 is mounted, is provided with a semiconductor laser LD which is a light source as shown in FIG. 5. The semiconductor laser LD is a GaN series blue violet semiconductor laser or SHG blue violet laser which projects the light flux of the wavelength of about 400 nm. The diverging light flux projected from this semiconductor laser LD transmits a polarized light beam splitter Bs and after it becomes the light flux of the circularly polarized light via ¼ wavelength plate WP, it becomes the parallel light flux by the collimator lens COL. This parallel light flux is incident on the expander lens EXP. The diameter of the light flux via the expander lens EXP is enlarged, and after through the stop ST, it becomes the converged light spot formed on the information recording surface DR of the optical disk (also called the optical information recording medium) through the protective layer DP of the optical disk OD by the objective lens OBJ.

The objective lens OBJ is driven in the focus direction and tracking direction by a 2-axes actuator AC1 arranged around it: In the objective lens OBJ, the numerical aperture on the optical disk side is not smaller than 0.8, and when the flange portions FL1 and FL2 which are integrally molded with the optical surface of respective lens groups, are engaged with each other, they are integrally assembled. Then, by the flange portion FL1 of the first lens group E1, it can be accurately fitted to the optical pickup apparatus PU1.

After the reflected light flux modulated by the information pit on the information recording surface DR transmits again the objective lens OBJ, stop ST, and expander lens EXP, it becomes the converging light flux by the collimator lens COL. After this converging light flux is made the linearly polarized light by ¼ wavelength plate WP, it is reflected by the polarized light beam splitter BS, and astigmatism is given by passing through the cylindrical lens CY, and concave lens NL, and it is converged on the light receiving surface of the photo detector PD. Then, by using the focus error signal or tracking error signal generated according to the output signal of the photo detector PD, the recording and/or reproducing of the information is conducted onto the optical disk OD.

Hereupon, the optical information recording reproducing apparatus is structured by having the above-described optical pickup apparatus PU1 and optical information recording medium supporting means, not shown, for supporting the optical disk OD by this optical pickup apparatus so that the recording and/or reproducing of the information can be conducted. The optical information recording medium supporting means is structured by the rotation drive apparatus which holds the central portion of the optical disk OD and rotation-operates the OD.

In the optical pickup apparatus PU1 structured as described above, and the optical pickup apparatus PU1 in the optical information recording reproducing apparatus, when the spherical aberration of the converged light spot on the information recording surface is increased by various error factors, such spherical aberration is corrected when the position of the first lens group L1 of the expander lens EX is changed by a one axis actuator AC2, corresponding to the increased amount of the spherical aberration. When the spherical aberration of the converged light spot is increased to the excessive correction direction (over direction), the first lens group L1 is moved so that the interval between the first lens group L1 and the second lens group L2 is reduced, and when the spherical aberration of the converged light spot is increased to the insufficient correction direction (under direction), the first lens group L1 is moved so that the interval between the first lens group L1 and the second lens group L2 is increased. In this case, by the movement, the decentering error of the first lens group L1 to the objective lens OBJ is generated, however, because the optical system OS1 for the optical pickup apparatus is structured so that it satisfies expressions (1) to (3), the increase of the coma of the converged light spot can be effectively suppressed.

Figure 10:
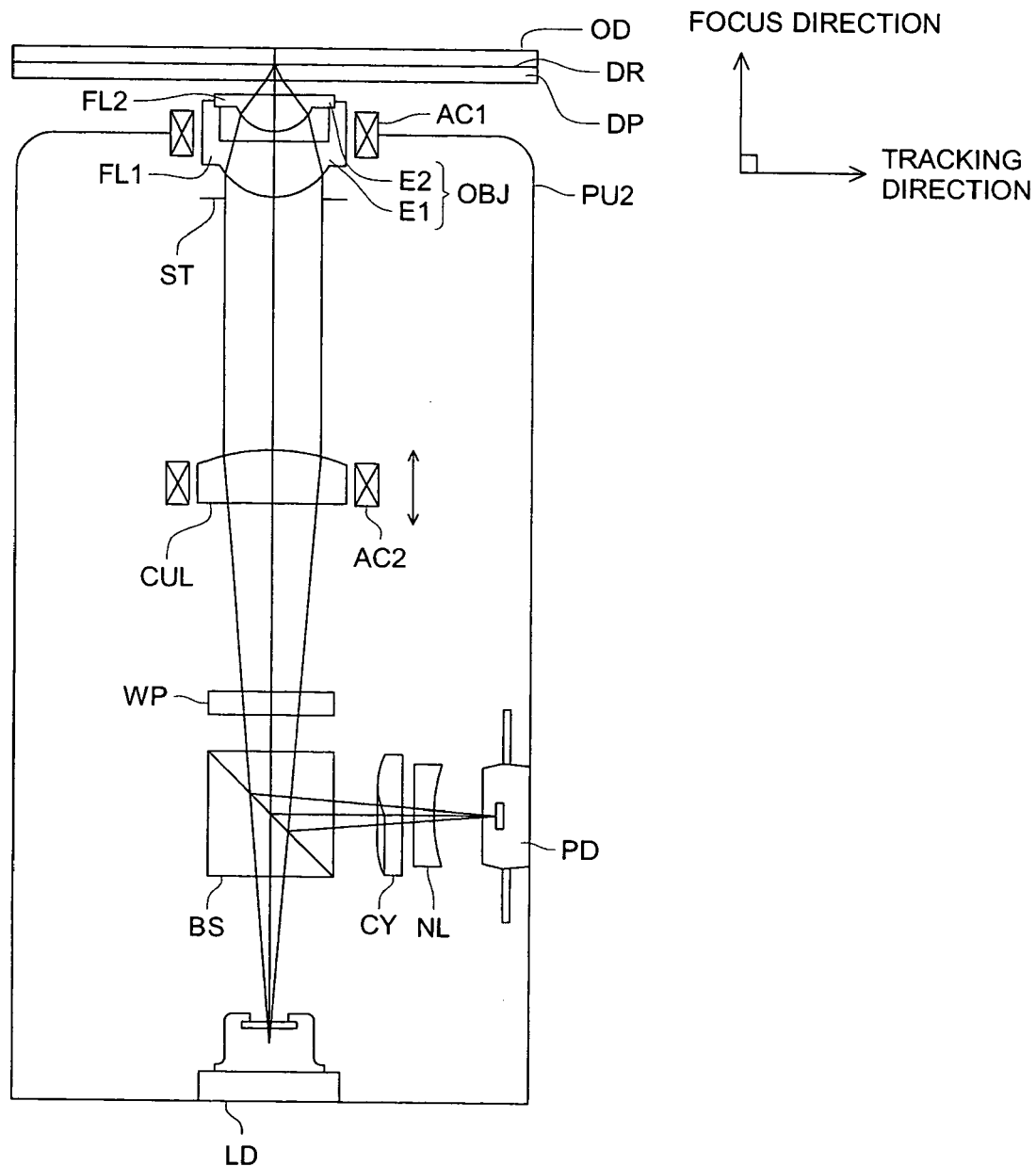
FIG. 10 is a view generally showing a composition of the optical pickup apparatus according to the second embodiment.
Figure 11:
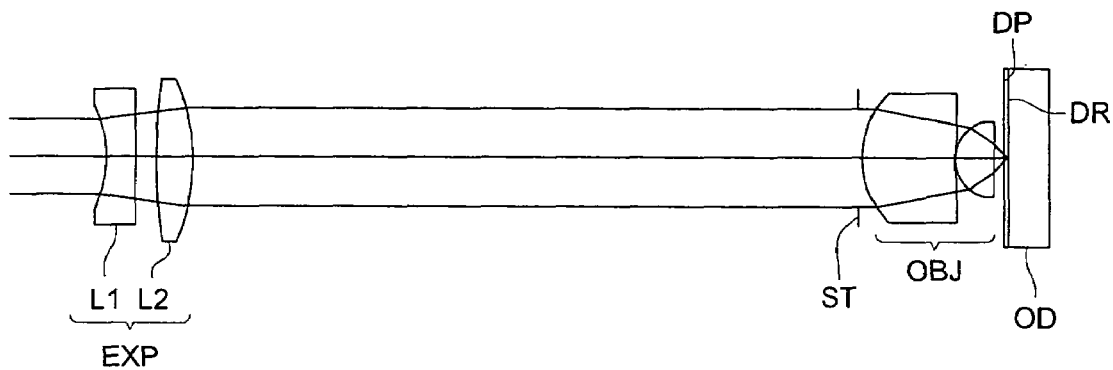
FIG. 11 is a sectional view of the optical system for the optical pickup apparatus according to the example 1.

FIG. 10 is an outline sectional view of the optical system for the optical pickup apparatus according to the second embodiment. The optical pickup apparatus PU2 in which the second optical pickup optical system OS2 according to the present embodiment is mounted, is provided with the semiconductor laser LD as the light source, as shown in FIG. 10. The semiconductor laser LD is a GaN series blue violet semiconductor laser or SHG blue violet laser which projects the light flux of the wavelength of about 400 nm. The diverging light flux projected from this semiconductor laser LD transmits a polarized light beam splitter Bs and after it becomes the light flux of the circularly polarized light via ¼ wavelength plate WP, it becomes the parallel light flux by the coupling lens CUL. The light flux via the coupling lens CUL becomes the converged light spot formed on the information recording surface DR through the protective layer DP of the optical disk OD by the objective lens OBJ after via the stop ST. The objective lens OBJ is driven in the focus direction and tracking direction by a 2-axes actuator AC1 arranged around it. In the objective lens OBJ, the numerical aperture on the optical disk side is not smaller than 0.8, and by the flange portion FL which is integrally molded with the optical surface, it can be accurately fitted to the optical pickup apparatus PU2.

After the reflected light flux modulated by the information pit on the information recording surface DR transmits again the objective lens OBJ and stop ST, it becomes the converging light flux by the coupling lens CUL. After this converging light flux is made the linearly polarized light by ¼ wavelength plate WP, it is reflected by the polarized light beam splitter BS, and astigmatism is given by passing through the cylindrical lens CY, and concave lens NL, and it is converged on the light receiving surface of the photo detector PD. Then, by using the focus error signal or tracking error signal generated according to the output signal of the photo detector PD, the recording and/or reproducing of the information is conducted onto the optical disk OD.

Hereupon, the optical information recording reproducing apparatus is structured by having the above-described optical pickup apparatus PU2 and optical information recording medium supporting means, not shown, for supporting the optical disk OD by this optical pickup apparatus so that the recording and/or reproducing of the information can be conducted. The optical information recording medium supporting means is structured by the rotation drive apparatus which holds the central portion of the optical disk OD and rotation-operates the OD.

In the optical pickup apparatus PU2 structured as described above, and the optical pickup apparatus PU2 in the above-described optical information recording reproducing apparatus, when the spherical aberration of the converged light spot on the information recording surface is increased by various error factors, such a spherical aberration is corrected when the position of the coupling lens CUL is changed by a one axis actuator AC2, corresponding to the increased amount of the spherical aberration. When the spherical aberration of the converged light spot is increased to the excessive correction direction (over direction), the coupling lens CUL is moved so that the interval between the coupling lens CUL and the objective lens OBJ is increased, and when the spherical aberration of the converged light spot is increased to the insufficient correction direction (under direction), the coupling lens CUL is moved so that the interval between the coupling lens CUL and the objective lens OBJ is reduced. In this case, by the movement, the decentering error of the coupling lens CUL to the objective lens OBJ is generated, however, because the optical system OS2 for the optical pickup apparatus is structured so that it satisfies expressions (1) to (3), the increase of the coma of the converged light spot can be effectively suppressed.

EXAMPLE

Next, 2 examples preferable as the above-described optical pickup optical systems OS1 and OS2, will be described. The aspheric surface in the optical pickup optical system of each example is expressed in the following arithmetic expression 1 when the deformation amount from the plane tangent to the apex of the surface is X (mm), the height in the perpendicular direction to the optical axis is h (mm), and the radius of curvature is r (mm). Where $\kappa$ is a conical coefficient, and A, i are aspheric surface coefficient.

$$X = \frac{h^2/r}{1+\sqrt{1-(1+\kappa)h^2/r^2}} + \sum_{i=2}^{8} A_{2i}h^{2i} \quad [\text{Arith. 1}]$$

Further, in the lens data table of each Example, r (mm) is the radius of curvature, d (mm) is a surface interval, Nd is the refractive index in a d-line, N$\lambda$ is the refractive index in the wavelength 405 nm, and vd expresses an Abbe's number in a d-line. Hereupon, hereafter (including the lens data in the table), an exponent of 10 (for example, $2.5 \times 10^{-3}$) is expressed by using E (for example, 2.5×E−3).

Example 1

In Table 1, the lens data of the optical system for the optical pickup apparatus of Example 1 is shown, and its sectional view is shown in FIG. 1. The optical system for the optical pickup apparatus of Example 1 is preferable as the above-described optical pickup optical system OS1, and has the expander lens EXP which is composed of 2 plastic lenses of the negative lens L1 and the positive lens L2 and changes the light flux diameter, and the objective lens OBJ which is composed of 2 plastic lenses for light converging the light flux of the wavelength 405 nm through the protective layer DP of 0.1 mm thickness on the information recording surface DR of the optical disk OD and has the focal length 1.76 mm, and numerical aperture of 0.85.

TABLE 1

| Surface No. | r (mm) | d (mm) | N$\lambda$ | vd | Note |
|---|---|---|---|---|---|
| 0 | | ∞ | | | Light source |
| 1 | −3.6224 | 0.8000 | 1.52469 | 56.5 | Expander lens |
| 2 | 66.0162 | 0.6000 | | | |
| 3 | 21.5167 | 1.000 | 1.52469 | 56.5 | |
| 4 | −5.2505 | 18.0000 | | | |
| 5 | 2.0966 | 2.5000 | 1.56013 | 56.5 | Objective lens |
| 6 | 6.2900 | 0.0500 | | | |
| 7 | 0.8880 | 1.1000 | 1.52469 | 56.3 | |
| 8 | ∞ | 0.2559 | | | |
| 9 | ∞ | 0.1000 | 1.61950 | 30.0 | Protective layer |
| 10 | ∞ | | | | |

Aspheric surface coefficient

| | The 1$^{st}$ surface | The 2$^{nd}$ surface | The 3$^{rd}$ surface | The 4$^{th}$ surface | The 5$^{th}$ surface | The 6$^{th}$ surface | The 7$^{th}$ surface |
|---|---|---|---|---|---|---|---|
| $\kappa$ | −6.97814E−01 | 0.00000E+00 | −2.95711E+01 | −5.00803E−01 | −1.68114E−01 | 4.86250E+00 | −8.09269E−01 |
| A4 | −9.95924E−06 | 4.79783E−05 | −2.18911E−04 | 3.87717E−05 | −4.68333E−03 | −2.21547E−03 | 1.16941E−01 |
| A6 | 1.47066E−01 | 5.89417E−05 | 3.79034E−05 | 3.29108E−05 | 6.11061E−04 | 1.75411E−02 | 2.88743E−02 |

TABLE 1-continued

| | | | | | | |
|---|---|---|---|---|---|---|
| A8  | 0.00000E+00 | 0.00000E+00 | 0.00000E+00 | 0.00000E+00 | −9.46597E−04 | −9.51333E−03 | 1.27454E−01 |
| A10 | 0.00000E+00 | 0.00000E+00 | 0.00000E+00 | 0.00000E+00 | 2.33843E−04  | −1.79513E−02 | −8.77260E−02 |
| A12 | 0.00000E+00 | 0.00000E+00 | 0.00000E+00 | 0.00000E+00 | −1.55675E−04 | 8.98785E−03  | 0.00000E+00 |
| A14 | 0.00000E+00 | 0.00000E+00 | 0.00000E+00 | 0.00000E+00 | 6.63819E−05  | 0.00000E+00  | 0.00000E+00 |
| A16 | 0.00000E+00 | 0.00000E+00 | 0.00000E+00 | 0.00000E+00 | −1.88569E−05 | 0.00000E+00  | 0.00000E+00 |

Figure 12:
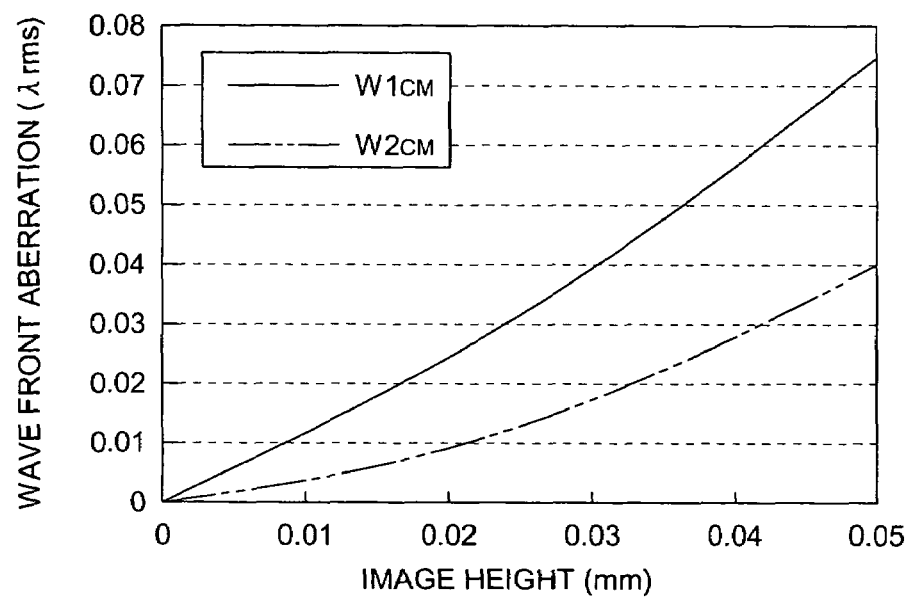
FIG. 12 is a view showing the relationship between the image height and the wave-front aberration of the optical system for the optical pickup apparatus according to the example 1.

Because the objective lens OBJ secures enough the allowable tolerance for the optical axis dislocation of mutual optical surfaces of each lens or the decentering error when each lens is assembled, and further, the working distance when the recording and/or reproducing of the information is conducted on the optical disk OD, the coma $W1_{CM}$ in the off-axis characteristic as shown in FIG. 12 remains. Then, in the expander lens EXP, for the down-sizing of the optical system for the optical pickup apparatus, the magnification is set to 1.25 and the interval between the negative lens L1 and the positive lens L2 is set to 0.6 mm.

Figure 13:
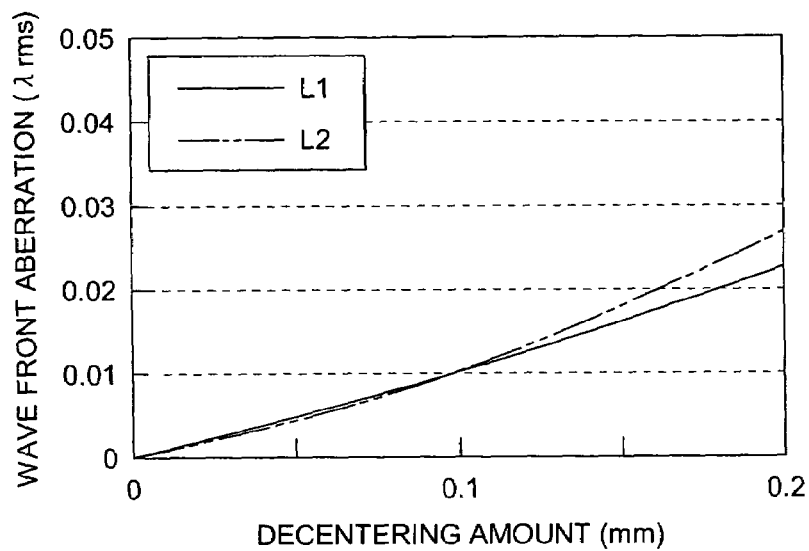
FIG. 13 is a view showing the relationship between the wave-front aberration and the eccentricity amount.

In this optical system for the optical pickup apparatus, as shown in FIG. 12, the shape of the aspheric surface of the expander lens EXP is determined so that the off-axis characteristic $W2_{CM}$ of the system in which the expander lens EXP and the objective lens OBJ are combined, satisfies the above-described expressions (1) and (2), and satisfies the above-described expression (3) as the specific numeral values are shown in the following Table 2. As described above, when the shape of the aspheric surface of the expander lens EXP is determined, in the optical system for this optical pickup apparatus, in the case where each lens of the expander lens EXP has the decentering error to the objective lens OBJ, when the inclined light flux is incident on the objective lens OBJ, the coma generated in the objective lens OBJ and the coma generated in the expander lens EXP itself are effectively cancelled. As the result, as shown in FIG. 13, although it is a down-sized optical system for the optical pickup apparatus, the allowable tolerance for the decentering error of each lens of the expander lens EXP is largely secured.

TABLE 2

| | L1 eccentricity | L2 eccentricity |
|---|---|---|
| Δ | 0.1 mm | 0.1 mm |
| Y2 | 0.022 mm | 0.022 mm |
| $W3_{CM}$ | 0.011 λrms | 0.010 λrms |
| $W4_{CM}$ | 0.010 λrms | 0.011 λrms |
| $\lvert(W3_{CM} - W4_{CM})/W3_{CM}\rvert$ | 0.09 | 0.10 |

Example 2

Figure 14:
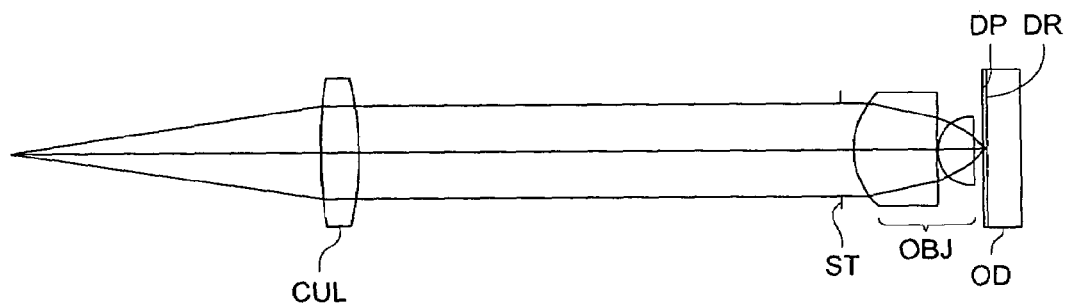
FIG. 14 is a sectional view of the optical system for the optical pickup apparatus according to the example 2.
Figure 15:
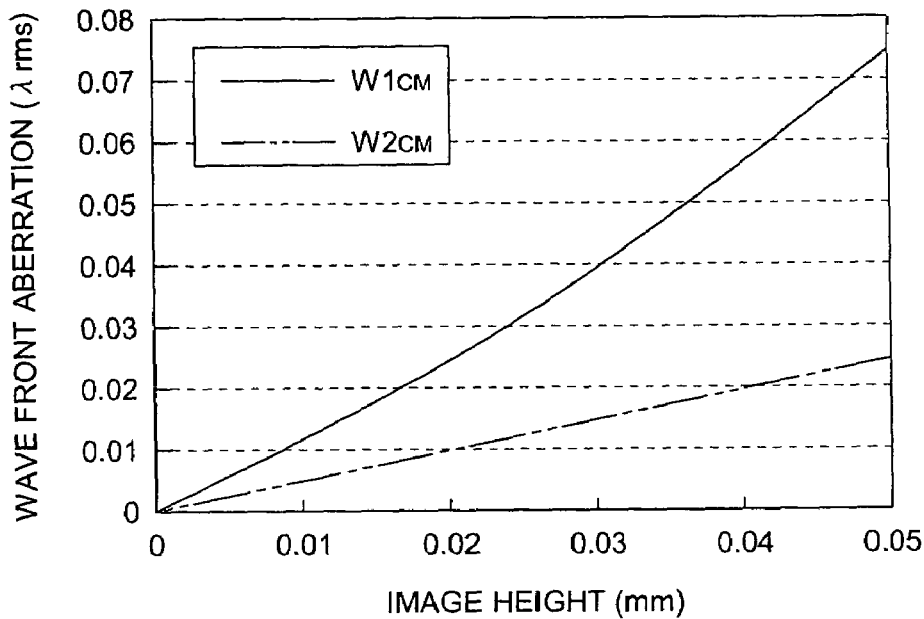
FIG. 15 is a view showing the relationship between the image height and the wave-front aberration of the optical system for the optical pickup apparatus according to the example 2.

The lens data of the optical system for the optical pickup apparatus of Example 1 is shown in Table 3, and its sectional view is shown in FIG. 14. The optical system for the optical pickup apparatus of Example 2 is preferable as the above-described optical pickup optical system OS2, and has the coupling lens CUL which convertes the divergent light flux of the wavelength 405 nm projected from the light source into the parallel light flux and guides to the objective lens OBJ, and th e objective lens which is composed of 2 plastic lenses to light converges the light flux through this coupling lens on the information recording surface DR of the optical disk OD through the protective layer DP of 0.1 mm thickness, and has the focal length of 1.76 mm, and numerical aperture of 0.85. The objective lens OBJ is the same as the objective lens OBJ in the optical system for the optical pickup apparatus of Example 1, and the coma $W1_{CM}$ in the off-axis characteristic as shown in Fig. 15 remains. Then, in the coupling lens CUL, for the down sizing of the optical system for the optical pickup apparatus, the numerical aperture is set to 0.15, and focal length is set to 10 mm.

TABLE 3

| Surface No. | r (mm) | d (mm) | Nλ | νd | note |
|---|---|---|---|---|---|
| 0 |          | 9.4060  |         |      | Light source |
| 1 | 20.0406  | 1.200   | 1.52469 | 56.5 | Coupling lens |
| 2 | −6.9614  | 15.0000 |         |      | |
| 3 | 2.0966   | 2.5000  | 1.56013 | 56.5 | Objective lens |
| 4 | 6.2900   | 0.0500  |         |      | |
| 5 | 0.8880   | 1.1000  | 1.52469 | 56.3 | |
| 6 | ∞        | 0.2559  |         |      | |
| 7 | ∞        | 0.1000  | 1.61950 | 30.0 | Protective |
| 8 | ∞        |         |         |      | layer |

| Aspheric surface coefficient | | | | | |
|---|---|---|---|---|---|
| | The 1st surface | The 2nd surface | The 3rd surface | The 4th surface | The 5th surface |
| κ  | −4.16531E−01 | 7.60324E−01 | −1.68114E−01 | 4.86250E+00  | −8.09269E−01 |
| A4 | −3.96832E−04 | 4.46246E−04 | −4.68333E−03 | −2.21547E−03 | 1.16941E−01 |
| A6 | 0.00000E+00  | 8.02679E−06 | 6.11061E−04  | 1.75411E−02  | 2.88743E−02 |
| A8 | 0.00000E+00  | 0.00000E+00 | −9.46597E−04 | −9.51333E−03 | 1.27454E−01 |

TABLE 3-continued

| A10 | 0.00000E+00 | 0.00000E+00 | 2.33843E−04 | −1.79513E−02 | −8.77260E−02 |
|---|---|---|---|---|---|
| A12 | 0.00000E+00 | 0.00000E+00 | −1.55675E−04 | 8.98785E−03 | 0.00000E+00 |
| A14 | 0.00000E+00 | 0.00000E+00 | 6.63819E−05 | 0.00000E+00 | 0.00000E+00 |
| A16 | 0.00000E+00 | 0.00000E+00 | −1.88569E−05 | 0.00000E+00 | 0.00000E+00 |

Figure 16:
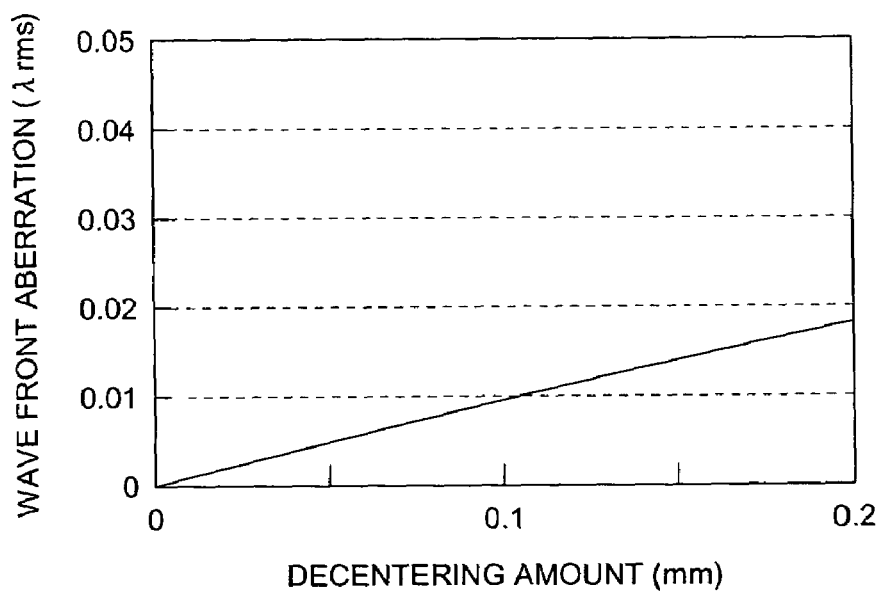
FIG. 16 is a view showing the relationship between the wave-front aberration and the eccentricity amount.

In this optical system for the optical pickup apparatus, as shown in FIG. 15, the shape of the aspheric surface of the coupling lens is determined so that the off-axis characteristic $W2_{CM}$ of the system in which the coupling lens CUL and the objective lens OBJ are combined, satisfies the above-described expressions (7) and (8), and satisfies the above-described expression (9) as specific numeral values are shown in the following Table 4. When the shape of the aspheric surface of the coupling lens CUL is determined in this manner, in this optical system for the optical pickup apparatus, when the coupling lens CUL has the decentering error to the objective lens OBJ, the coma generated in the objective lens OBJ when the inclined light flux is incident on the objective lens OBJ, and the coma generated in the coupling lens itself CUL, are effectively cancelled. As the result, as shown in FIG. 16, although it is a down-sized optical system for the optical pickup apparatus, the allowable tolerance for the decentering error of the coupling lens CUL is largely secured.

TABLE 4

|  | COL eccentricity |
|---|---|
| Δ | 0.1 mm |
| Y2 | 0.018 mm |
| $W3_{CM}$ | 0.010 λrms |
| $W4_{CM}$ | 0.009 λrms |
| $\|(W3_{CM} − W4_{CM})/W3_{CM}\|$ | 0.10 |

According to the invention, the light source whose wavelength is short, and the objective lens whose numerical aperture is large, are used, and even when the movable lens used for the optical system for the optical pickup apparatus in which the spherical aberration of the converged light spot is corrected by the expander lens or coupling lens which is arranged in the optical path between the light source and the objective lens, has the decentering error, the optical system for the optical pickup apparatus in which the deterioration of the light converging performance is small, can be provided. Then, the optical pickup apparatus or optical information recording reproducing apparatus which is provided with this optical system for the optical pickup apparatus, can be provided.

What is claimed is:

1. An optical system for use in an optical pickup apparatus, comprising:
   an expander lens including at least two lens groups and to convert a diameter of a light flux; and
   an objective lens to converge the light flux from the expander lens;
   wherein the following formula is satisfied:

$W1_{CM} > W2_{CM}$ where $W1_{CM}$ is a coma aberration (λrms) of a converged light spot when an off-axial light flux of a wavelength λ (nm) emitted so as to converge at a position distant in a vertical direction from the optical axis of the objective lens by an arbitrary distance Y1 (mm) not larger than 0.05 (mm) comes into the objective lens, and $W2_{CM}$ is a coma aberration (λrms) of a converged spot when an off-axial light flux of the wavelength λ (nm) emitted so as to converge at a position distant in a vertical direction from the optical axis of the objective lens by the arbitrary distance Y1 (mm) comes through the expander lens into the objective lens on a condition that the optical axis of all lens groups constructing the expander lens is arranged so as to conform with the optical axis of the objective lens.

2. The optical system of claim 1, wherein the following formula is satisfied:

H2>H1 where ±H1 (mm) (H1>0) is a range of image height within which the coma aberration of a converged light spot becomes less than 0.07 (λrms) when an off-axial light flux of the wavelength λ (nm) comes into the objective lens, and
   ±H2 (mm) (H2>0) is a range of image height within which the coma aberration of a converged light spot becomes less than 0.07 (λrms) when an off-axial light flux of the wavelength λ (nm) comes through the expander lens into the objective lens on the condition that the optical axis of all lens groups constructing the expander lens is arranged so as to conform with the optical axis of the objective lens.

3. The optical system of claim 1, wherein the following formula is satisfied:

$|(W3_{CM} − W4_{CM})/W3_{CM}| < 0.5$ where $W3_{CM}$ is a coma aberration (λrms) of a converged light spot when an axial light flux of the wavelength λ (nm) comes through the expander lens into the objective lens and Y2 is a distance (mm) measured in a vertical direction from the optical axis to the converged light spot on a condition that the optical axis of an arbitrary lens group among the lens groups constructing the expander lens is arranged to conform with the optical axis of the objective lens and the lens group except the arbitrary lens is arranged to shift in a vertical direction from the optical axis by an arbitrary distance Δ (mm) not larger than 0.1 (mm), and $W4_{CM}$ is a coma aberration (λrms) of a converged light spot when an off-axial light flux of the wavelength λ (nm) emitted so as to converge at a position distant in a vertical direction from the optical axis by the distance Y2 (mm) comes through the expander lens into the objective lens on a condition that the optical axis of all lens groups constructing the expander lens is arranged so as to conform with the optical axis of the objective lens.

4. The optical system of claim 1, wherein the expander lens comprises at least one aspherical surface.

5. The optical system of claim 1, wherein the numerical aperture of the objective lens is 0.8 or more and the expander lens changes an incident angle of a marginal ray of a light flux coming into the objective lens by changing a distance among the lens groups constructing the expander lens.

6. The optical system of claim 1, wherein the objective lens comprises at least two lens groups.

7. The optical system of claim 1, wherein the total length of the expander lens measured on the optical axis is 3 mm or less.

8. The optical system of claim 1, wherein a magnification γ of the expander lens satisfies the following formula:

$$\gamma = D2/D1 > 1.2$$

where D1 is a diameter (mm) of a light flux coming into the expander lens, and

D2 is a diameter (mm) of the light flux going out from the expander lens.

9. An optical pickup apparatus, comprising:
a light source to emit a light flux of a wavelength λ (nm); and
an optical system to converge the light flux emitted from the light source onto an information recording plane of an optical information recording medium so that the optical pickup apparatus conducts recording and/or reproducing information, the optical system including an objective lens located opposite to an optical information recording medium, and
an expander lens provided between the light source and the objective lens and including at least two lens groups;
wherein at least one lens group among the lens groups constructing the expander lens is structured to be shiftable in the optical axis direction and the shiftable lens group is shifted in the optical axis direction to change a distance among the lens groups constructing the expander lens in such a way that a spherical aberration correction is conducted for a converged light spot on the information recording plane;
wherein the following formula is satisfied:

$$W1_{CM} > W2_{CM}$$

Where $W1_{CM}$ is a coma aberration (λrms) of a converged light spot when an off-axial light flux of the wavelength λ (nm) emitted so as to converge at a position distant in a vertical direction from the optical axis of the objective lens by an arbitrary distance Y1 (mm) not larger than 0.05 (mm) comes into the objective lens, and $W2_{CM}$ is a coma aberration (λrms) of a converged spot when an off-axial light flux of the wavelength λ (nm) emitted so as to converge at a position distant in a vertical direction from the optical axis of the objective lens by the arbitrary distance Y1 (mm) comes through the expander lens into the objective lens on a condition that the optical axis of all lens groups constructing the expander lens is arranged so as to conform with the optical axis of the objective lens.

10. The optical pickup apparatus of claim 9, wherein the following formula is satisfied:

$$H2 > H1$$

Where ±H1 (mm) (H1>0) is a range of image height within which the coma aberration of a converged light spot becomes less than 0.07 (λrms) when an off-axial light flux of the wavelength λ (nm) comes into the objective lens, and ±H2 (mm) (H2>0) is a range of image height within which the coma aberration of a converged light spot becomes less than 0.07 (λrms) when an off-axial light flux of the wavelength λ (nm) comes through the expander lens into the objective lens on the condition that the optical axis of all lens groups constructing the expander lens is arranged so as to conform with the optical axis of the objective lens.

11. The optical pickup apparatus of claim 9, wherein the following formula is satisfied:

$$|(W3_{CM} - W4_{CM})/W3_{CM}| < 0.5$$

where $W3_{CM}$ is a coma aberration (λrms) of a converged light spot when an axial light flux of the wavelength λ (nm) comes through the expander lens into the objective lens and Y2 is a distance (mm) measured in a vertical direction from the optical axis to the converged light spot on a condition that the optical axis of an arbitrary lens group among the lens groups constructing the expander lens is arranged to conform with the optical axis of the objective lens and the lens group except the arbitrary lens is arranged to shift in a vertical direction from the optical axis by an arbitrary distance Δ (mm) not larger than 0.1 (mm), and $W4_{CM}$ is a coma aberration (λrms) of a converged light spot when an off-axial light flux of the wavelength λ (nm) emitted so as to converge at a position distant in a vertical direction from the optical axis by the distance Y2 (mm) comes through the expander lens into the objective lens on a condition that the optical axis of all lens groups constructing the expander lens is arranged so as to conform with the optical axis of the objective lens.

12. The optical pickup apparatus of claim 9, wherein the expander lens comprises at least one aspherical surface.

13. The optical pickup apparatus of claim 9, wherein the numerical aperture of the objective lens is 0.8 or more.

14. The optical pickup apparatus of claim 9, wherein the objective lens comprises at least two lens groups.

15. The optical pickup apparatus of claim 9, wherein the total length of the expander lens measure on the optical axis is 3 mm or less.

16. The optical pickup apparatus of claim 9, wherein a magnification γ of the expander lens satisfies the following formula:

$$\gamma = D2/D1 > 1.2$$

where D1 is a diameter (mm) of a light flux coming into the expander lens, and

D2 is a diameter (mm) of the light flux going out from the expander lens.

17. An optical information recording reproducing apparatus, comprising:
the optical pickup apparatus described in claim 9, and
a supporting device to support an optical information recording medium at a position where recording and/or reproducing information is conducted for the optical information recording medium by the optical pickup apparatus.

18. An optical system for use in an optical pickup apparatus, comprising:
a coupling lens to change a divergent angle of an incident light flux; and
an objective lens to converge the light flux from the coupling lens;
wherein the following formula is satisfied:

$$W1_{CM} > W2_{CM}$$

where $W1_{CM}$ is a coma aberration (λrms) of a converged light spot when an off-axial light flux of a wavelength λ (nm) emitted so as to converge at a position distant in a vertical direction from the optical axis of the objective lens by an arbitrary distance Y1 (mm) not larger than 0.05 (mm) comes into the objective lens, and $W2_{CM}$ is a coma aberration (λrms) of a converged spot when an off-axial light flux of the wavelength λ (nm)

emitted so as to converge at a position distant in a vertical direction from the optical axis of the objective lens by the arbitrary distance Y1 (mm) comes through the coupling lens into the objective lens on a condition that the optical axis of the coupling lens is arranged so as to conform with the optical axis of the objective lens.

19. The optical system of claim 18, wherein the following formula is satisfied:

$$H2 > H1$$

where ±H1 (mm) (H1>0) is a range of image height within which the coma aberration of a converged light spot becomes less than 0.07 (λrms) when an off-axial light flux of the wavelength λ (nm) comes into the objective lens, and ±H2 (mm) (H2>0) is a range of image height within which the coma aberration of a converged light spot becomes less than 0.07 (λrms) when an off-axial light flux of the wavelength λ (nm) comes through the coupling lens into the objective lens on the condition that the optical axis of the coupling lens is arranged so as to conform with the optical axis of the objective lens.

20. The optical system of claim 18, wherein the following formula is satisfied:

$$|(W3_{CM} - W4_{CM})/W3_{CM}| < 0.5$$

where $W3_{CM}$ is a coma aberration (λrms) of a converged light spot when an axial light flux of the wavelength λ (nm) comes through the coupling lens into the objective lens and Y2 is a distance (mm) measured in a vertical direction from the optical axis to the converged light spot on a condition that the coupling lens is arranged to shift in a vertical direction from the optical axis by an arbitrary distance Δ (mm) not larger than 0.1 (mm), and $W4_{CM}$ is a coma aberration (λrms) of a converged light spot when an off-axial light flux of the wavelength λ (nm) emitted so as to converge at a position distant in a vertical direction from the optical axis by the distance Y2 (mm) comes through the coupling lens into the objective lens on a condition that the optical axis of the coupling lens is arranged so as to conform with the optical axis of the objective lens.

21. The optical system of claim 18, wherein the coupling lens comprises at least one aspherical surface.

22. The optical system of claim 18, wherein the numerical aperture of the objective lens is 0.8 or more and the coupling lens changes an incident angle of a marginal ray of a light flux coming into the objective lens by changing a distance to the objective lens.

23. The optical system of claim 18, wherein the objective lens comprises at least two lens groups.

24. The optical system of claim 18, wherein the absolute value of the ratio of the numerical aperture of the coupling lens to the numerical aperture is 0.1 or more and the following formula is satisfied:

$$|NA_{CUP}/NA_{OBJ}| > 0.1$$

where $NA_{CUP}$ is the numerical aperture of the coupling lens, and $NA_{OBJ}$ is the numerical aperture of the objective lens.

25. An optical pickup apparatus, comprising:
a light source to emit a light flux of a wavelength λ (nm); and
an optical system to converge the light flux emitted from the light source onto an information recording plane of an optical information recording medium so that the optical pickup apparatus conducts recording and/or reproducing information, the optical system including an objective lens located opposite to an optical information recording medium, and
a coupling lens provided between the light source and the objective lens and to change a divergent angle of a divergent light flux emitted from the light source;
wherein the coupling lens is structured to be shiftable in the optical axis direction and the coupling lens is shifted in the optical axis direction to change a distance to the objective lens in such a way that a spherical aberration correction is conducted for a converged light spot on the information recording plane;
wherein the following formula is satisfied:

$$W1_{CM} > W2_{CM}$$

Where $W1_{CM}$ is a coma aberration (λrms) of a converged light spot when an off-axial light flux of the wavelength λ (nm) emitted so as to converge at a position distant in a vertical direction from the optical axis of the objective lens by an arbitrary distance Y1 (mm) not larger than 0.05 (mm) comes into the objective lens, and $W2_{CM}$ is a coma aberration (λrms) of a converged spot when an off-axial light flux of the wavelength λ (nm) emitted so as to converge at a position distant in a vertical direction from the optical axis of the objective lens by the arbitrary distance Y1 (mm) comes through the coupling lens into the objective lens on a condition that the optical axis of the coupling lens is arranged so as to conform with the optical axis of the objective lens.

26. The optical pickup apparatus of claim 25, wherein the following formula is satisfied:

$$H2 > H1$$

Where ±H1 (mm) (H1>0) is a range of image height within which the coma aberration of a converged light spot becomes less than 0.07 (λrms) when an off-axial light flux of the wavelength λ (nm) comes into the objective lens, and ±H2 (mm) (H2>0) is a range of image height within which the coma aberration of a converged light spot becomes less than 0.07 (λrms) when an off-axial light flux of the wavelength λ (nm) comes through the coupling lens into the objective lens on the condition that the optical axis of the coupling lens is arranged so as to conform with the optical axis of the objective lens.

27. The optical pickup apparatus of claim 25, wherein the following formula is satisfied:

$$|(W3_{CM} - W4_{CM})/W3_{CM}| < 0.5$$

where $W3_{CM}$ is a coma aberration (λrms) of a converged light spot when an axial light flux of the wavelength λ (nm) comes through the coupling lens into the objective lens and Y2 is a distance (mm) measured in a vertical direction from the optical axis to the converged light spot on a condition that the coupling lens is arranged to shift in a vertical direction from the optical axis by an arbitrary distance Δ (mm) not larger than 0.1 (mm), and $W4_{CM}$ is a coma aberration (λrms) of a converged light spot when an off-axial light flux of the wavelength λ (nm) emitted so as to converge at a position distant in a vertical direction from the optical axis by the distance Y2 (mm) comes through the coupling lens into the objective lens on a condition that the optical axis of the coupling lens is arranged so as to conform with the optical axis of the objective lens.

28. The optical pickup apparatus of claim 25, wherein the coupling lens comprises at least one aspherical surface.

29. The optical pickup apparatus of claim 25, wherein the numerical aperture of the objective lens is 0.8 or more.

30. The optical pickup apparatus of claim 25, wherein the objective lens comprises at least two lens groups.

31. The optical pickup apparatus of claim 25, wherein the absolute value of the ratio of the numerical aperture of the coupling lens to the numerical aperture is 0.1 or more and the following formula is satisfied:

$$|NA_{CUP}/NA_{OBJ}| > 0.1$$

where $NA_{CUP}$ is the numerical aperture of the coupling lens, and $NA_{OBJ}$ is the numerical aperture of the objective lens.

32. An optical information recording reproducing apparatus, comprising:

the optical pickup apparatus described in claim 25, and
a supporting device to support an optical information recording medium at a position where recording and/or reproducing information is conducted for the optical information recording medium by the optical pickup apparatus.

* * * * *